(12) United States Patent
Ginossar

(10) Patent No.: US 6,477,143 B1
(45) Date of Patent: Nov. 5, 2002

(54) METHOD AND APPARATUS FOR PACKET NETWORK CONGESTION AVOIDANCE AND CONTROL

(76) Inventor: Dror Ginossar, 8 Drezner Street, Tel Aviv 69497 (IL)

( * ) Notice: Subject to any disclaimer, the term of this patent is extended or adjusted under 35 U.S.C. 154(b) by 0 days.

(21) Appl. No.: 09/223,611

(22) Filed: Dec. 30, 1998

(30) Foreign Application Priority Data

Jan. 25, 1998 (IL) ................................................ 123047
Mar. 29, 1998 (IL) ................................................ 123880

(51) Int. Cl.[7] ............................. H04L 12/28; H04J 3/16
(52) U.S. Cl. ...................... 370/230; 370/232; 370/235; 370/401; 370/471; 709/230; 709/235
(58) Field of Search ................................. 370/229, 230, 370/230.1, 232, 235, 352, 389, 354, 356, 357, 360, 400, 401–471; 709/230, 227, 231, 232, 234, 235–238, 246, 224

(56) References Cited

U.S. PATENT DOCUMENTS

| 4,161,778 A | 7/1979 | Getson, Jr. et al. ......... 364/200 |
| 4,270,205 A | 5/1981 | DeShon ........................ 371/32 |
| 4,317,134 A | 2/1982 | Woo et al. ................... 358/213 |

(List continued on next page.)

OTHER PUBLICATIONS

Tannenmaum, A.S., "Computer Networks", Third Editioin, Pretice–Hall, 1996. pp. 536–539.*
Dige et al. "Congestion Avoidance Strategies in Broadband Networks", AT&T Bell Laboratories Holmdel, NJ 0733, IEEE 1991.*
Comer et al. "A Rate–Based Congestion Avoidance and Control Scheme for Packet Switched Networks", IEEE 1990.*
Tannenbaum, A.S., in *Computer Networks*, Third Edition, Pretice–Hall, pp. 536–539, 374–395 1996).
Bournas, R.M., "Optimization of TCP Segment Size for File Transfer," Journal of Research and Development, vol. 41, No. 3—*Performance Analysis and its Impact on Design* (PAID), pp. 1–12, provided on the Internet at http://www.al-maden.ibm.com/journal/rd/413/bournas.html.

(List continued on next page.)

*Primary Examiner*—Alpus H. Hsu
*Assistant Examiner*—Afsar M Qureshi
(74) *Attorney, Agent, or Firm*—Marshall, Gerstein & Borun

(57) ABSTRACT

There is provided a method for congestion control and avoidance in computer networks, which method includes the steps of sensing network congestion (including both sensing and predicting possible future network congestion) and allowing a network node to transmit at least one basic data segment and thereafter to transmit additional data, the quantity of said additional data being a function of the basic data segment, wherein the size of the basic data segment is deteremined at least in part by the sensed network congestion. Prediction of possible future network congestion is possible, for example, by learning from a history of network load and/or by detecting an increase in the number of users or other indications. When possible future network congestion is predicted, the application of the methods and apparatus of the invention is operative to prevent the development of future congestion altogether or at least to limit the evolving severity level that such future congestion would have otherwise reached. Controlling the transmission rate of network nodes is an important technique to help prevent future congestion altogether and/or to limit the severity of such congestion. There is also provided an apparatus for congestion control and avoidance in computer networks.

20 Claims, 9 Drawing Sheets

U.S. PATENT DOCUMENTS

| | | | |
|---|---|---|---|
| 4,366,573 A | 12/1982 | Rauch | 375/106 |
| 4,439,859 A | 3/1984 | Donnan | 371/32 |
| 4,475,192 A | 10/1984 | Fernow et al. | 370/94 |
| 4,485,438 A | 11/1984 | Myrmo et al. | 364/200 |
| 4,589,111 A | 5/1986 | Adachi | 371/32 |
| 4,677,616 A | 6/1987 | Franklin | 370/94 |
| 4,691,314 A * | 9/1987 | Bergins et al. | 370/471 |
| 4,697,281 A | 9/1987 | O'Sullivan | 379/59 |
| 4,703,478 A | 10/1987 | Haselton et al. | 370/94 |
| 4,707,693 A | 11/1987 | Hessel | 340/825.51 |
| 4,712,214 A | 12/1987 | Melzer et al. | 371/32 |
| 4,726,036 A | 2/1988 | Sawyer et al. | 375/14 |
| 4,727,537 A | 2/1988 | Nichols | 370/85 |
| 4,730,348 A | 3/1988 | MacCrisken | 375/122 |
| 4,745,593 A | 5/1988 | Stewart | 370/15 |
| 4,769,815 A | 9/1988 | Hinch et al. | 370/94 |
| 4,771,424 A | 9/1988 | Suzuki et al. | 370/86 |
| 4,809,212 A | 2/1989 | New et al. | 364/757 |
| 4,839,891 A | 6/1989 | Kobyashi et al. | 370/94 |
| 4,845,656 A | 7/1989 | Nishibe et al. | 364/900 |
| 4,845,664 A | 7/1989 | Aichelmann, Jr. et al. | 364/900 |
| 4,851,990 A | 7/1989 | Johnson et al. | 364/200 |
| 4,852,088 A | 7/1989 | Gulick et al. | 370/94 |
| 4,852,127 A | 7/1989 | Fraser et al. | 375/94 |
| 4,855,905 A | 8/1989 | Estrada et al. | 364/200 |
| 4,860,193 A | 8/1989 | Bentley et al. | 364/200 |
| 4,862,461 A | 8/1989 | Blaner | 371/33 |
| 4,864,567 A | 9/1989 | Giorgio | 370/118 |
| 4,873,662 A | 10/1989 | Sargent | 364/900 |
| 4,875,161 A | 10/1989 | Lahti | 364/200 |
| 4,882,674 A | 11/1989 | Quint et al. | 364/200 |
| 4,888,684 A | 12/1989 | Lilja et al. | 364/200 |
| 4,888,812 A | 12/1989 | Dinan et al. | 382/7 |
| 4,897,835 A | 1/1990 | Gaskill et al. | 370/94.1 |
| 4,905,282 A | 2/1990 | McGlynn et al. | 380/48 |
| 4,907,225 A | 3/1990 | Gulick et al. | 370/94.1 |
| 4,908,828 A | 3/1990 | Tikalsky | 371/69.1 |
| 4,926,415 A | 5/1990 | Tawara et al. | 370/60 |
| 4,927,288 A | 5/1990 | Raswant | 404/1 |
| 4,929,939 A | 5/1990 | Varma et al. | 340/825.8 |
| 4,930,159 A | 5/1990 | Kravitz et al. | 380/23 |
| 4,935,869 A | 6/1990 | Yamamoto | 364/900 |
| 4,939,731 A | 7/1990 | Reed et al. | 371/32 |
| 4,941,144 A | 7/1990 | Mizukami | 371/5.5 |
| 4,951,278 A | 8/1990 | Biber et al. | 370/60 |
| 4,953,162 A | 8/1990 | Lyons et al. | 370/94.1 |
| 4,961,221 A | 10/1990 | Abiven | 380/21 |
| 4,964,046 A | 10/1990 | Mehrgardt et al. | 364/200 |
| 4,965,794 A | 10/1990 | Smith | 370/105.1 |
| 4,967,344 A | 10/1990 | Scavezze et al. | 364/200 |
| 4,977,498 A | 12/1990 | Rastegar et al. | 364/200 |
| 4,989,204 A | 1/1991 | Shimizu et al. | 370/94.1 |
| 4,992,926 A | 2/1991 | Janke et al. | 364/134 |
| 4,999,769 A | 3/1991 | Costes et al. | 364/200 |
| 5,008,663 A | 4/1991 | Adams | 340/825.5 |
| 5,008,879 A | 4/1991 | Fischer et al. | 370/85.2 |
| 5,010,553 A | 4/1991 | Scheller et al. | 371/35 |
| 5,014,186 A | 5/1991 | Chisholm | 364/200 |
| 5,036,316 A | 7/1991 | Kemplin | 340/728 |
| 5,038,343 A | 8/1991 | Lebizay et al. | 370/60 |
| 5,042,029 A | 8/1991 | Hayakawa | 370/60 |
| 5,053,987 A | 10/1991 | Genusov et al. | 364/736 |
| 5,056,058 A | 10/1991 | Hirata et al. | 364/900 |
| 5,056,088 A | 10/1991 | Price et al. | 370/94.1 |
| 5,058,005 A | 10/1991 | Culley | 364/200 |
| 5,058,110 A | 10/1991 | Beach et al. | 370/85.6 |
| 5,062,044 A | 10/1991 | Asami et al. | 364/200 |
| 5,063,494 A | 11/1991 | Davidowski et al. | 395/800 |
| 5,065,314 A | 11/1991 | Maskovyak | 395/325 |
| 5,073,821 A | 12/1991 | Juri | 358/133 |
| 5,077,677 A | 12/1991 | Murphy et al. | 395/10 |
| 5,077,732 A | 12/1991 | Fischer et al. | 370/85.4 |
| 5,084,871 A | 1/1992 | Carn et al. | 370/94.1 |
| 5,084,877 A | 1/1992 | Netravali et al. | 371/32 |
| 5,089,982 A | 2/1992 | Gran et al. | 364/726 |
| 5,097,331 A | 3/1992 | Chen et al. | 358/138 |
| 5,103,447 A | 4/1992 | Takiyasu et al. | 370/85.15 |
| 5,107,493 A | 4/1992 | Eng et al. | 370/94.1 |
| 5,109,490 A | 4/1992 | Arimilli et al. | 395/325 |
| 5,109,515 A | 4/1992 | Laggis et al. | 395/725 |
| 5,113,392 A | 5/1992 | Takiyasu et al. | 370/85.15 |
| 5,113,494 A | 5/1992 | Menendez et al. | 395/163 |
| 5,113,514 A | 5/1992 | Albonesi et al. | 395/425 |
| 5,115,429 A | 5/1992 | Hluchyj et al. | 370/84 |
| 5,115,431 A | 5/1992 | Williams et al. | 370/94.1 |
| 5,115,432 A | 5/1992 | Haas | 370/94.1 |
| 5,117,429 A | 5/1992 | Lagoutte | 370/60 |
| 5,119,367 A | 6/1992 | Kawakatsu et al. | 370/54 |
| 5,121,216 A | 6/1992 | Chen et al. | 358/261.3 |
| 5,121,390 A | 6/1992 | Farrell et al. | 370/94.1 |
| 5,121,479 A | 6/1992 | O'Brien | 395/250 |
| 5,122,685 A | 6/1992 | Chan et al. | 307/465.1 |
| 5,124,941 A | 6/1992 | Smith | 364/759 |
| 5,124,991 A | 6/1992 | Allen | 371/32 |
| 5,126,842 A | 6/1992 | Andrews et al. | 358/133 |
| RE34,034 E | 8/1992 | O'Sullivan | 379/59 |
| 5,136,584 A | 8/1992 | Hedlund | 370/94.1 |
| 5,142,532 A | 8/1992 | Adams | 370/94.1 |
| 5,168,497 A | 12/1992 | Ozaki et al. | 370/94.1 |
| 5,191,583 A | 3/1993 | Pearson et al. | 370/94.1 |
| 5,193,151 A | 3/1993 | Jain | 395/200 |
| 5,224,095 A | 6/1993 | Woest et al. | 370/85.13 |
| 5,239,545 A | 8/1993 | Buchholz | 370/95.3 |
| 5,257,258 A | 10/1993 | Birman et al. | 370/60 |
| 5,289,470 A | 2/1994 | Chang et al. | 370/94.1 |
| 5,303,344 A | 4/1994 | Yokoyama et al. | 395/200 |
| 5,303,347 A | 4/1994 | Gagne et al. | 395/250 |
| 5,307,348 A | 4/1994 | Buchholz et al. | 370/85.2 |
| 5,315,584 A | 5/1994 | Savary et al. | 370/18 |
| 5,339,368 A | 8/1994 | Higgins-Luthman et al. | 382/56 |
| 5,355,485 A | 10/1994 | Denio et al. | 395/650 |
| 5,377,332 A | 12/1994 | Entwistle et al. | 395/325 |
| 5,379,296 A | 1/1995 | Johnson et al. | 370/60 |
| 5,384,770 A | 1/1995 | Mays et al. | 370/43 |
| 5,384,780 A | 1/1995 | Lomp et al. | 370/94.1 |
| 5,400,329 A | 3/1995 | Tokura et al. | 370/84 |
| 5,406,643 A | 4/1995 | Burke et al. | 395/200 |
| 5,425,051 A | 6/1995 | Mahany | 375/202 |
| 5,426,640 A | 6/1995 | Hluchyj et al. | 370/94.1 |
| 5,452,299 A | 9/1995 | Thessin et al. | 370/62 |
| 5,457,680 A | 10/1995 | Kamm et al. | 370/17 |
| 5,477,753 A | 12/1995 | McKee et al. | 370/17 |
| 5,481,735 A | 1/1996 | Mortensen et al. | 395/200.1 |
| 5,483,526 A | 1/1996 | Ben-Nun et al. | 370/60.1 |
| 5,511,122 A | 4/1996 | Atkinson | 380/25 |
| 5,537,395 A | 7/1996 | Alles et al. | 370/17 |
| 5,539,736 A | 7/1996 | Johnson et al. | 370/60 |
| 5,541,919 A | 7/1996 | Yong et al. | 370/61 |
| 5,543,789 A | 8/1996 | Behr et al. | 340/995 |
| 5,561,806 A | 10/1996 | Fitchett et al. | 395/800 |
| 5,568,616 A | 10/1996 | Narayanaswami | 395/200.13 |
| 5,570,346 A | 10/1996 | Shur | 370/17 |
| 5,600,632 A | 2/1997 | Schulman | 370/252 |
| 5,602,831 A | 2/1997 | Gaskill | 370/252 |
| 5,631,935 A | 5/1997 | Ginossar | 375/377 |
| 5,633,865 A | 5/1997 | Short | 370/412 |
| 5,633,867 A | 5/1997 | Ben-Nun et al. | 370/399 |
| 5,664,075 A | 9/1997 | Park et al. | 395/114 |
| 5,671,430 A | 9/1997 | Gunzinger | 395/800 |
| 5,682,386 A | 10/1997 | Arimilli et al. | 370/468 |
| 5,696,903 A | 12/1997 | Mahany | 395/200.58 |

| | | | |
|---|---|---|---|
| 5,699,481 A | 12/1997 | Shlomot et al. | 395/2.37 |
| 5,706,439 A | 1/1998 | Parker | 395/200.17 |
| 5,838,904 A * | 11/1998 | Rostoker et al. | 709/230 |
| 5,963,543 A * | 10/1999 | Rostoker et al. | 370/232 |
| 5,978,849 A * | 11/1999 | Khanna | 709/227 |

OTHER PUBLICATIONS

Brakmo, L.S. et al., "TCP Vegas: A New Techniques for Congestion Detection and Avoidance," Proceedings SIG-COMM 94 Conf. ACM, pp. 24–35 (1994).

CAI, X., "The Performance of TCP Over ATM ABR and UBR Services," provided on the Internet at http://www.cis.ohio–state.edu/~jain/cis788–97/tcp_over_atm/index.htm.

Comer, D.E. et al., "A Rate–Based Congestion Avoidance and Control Scheme for Packet Switched Network," *IEEE*, Proceeding the 10th International Conf. on Distributed Computing Systems, pp. 390–397 (1990).

Danthine, A., "A New Transport Protocol for the Broadband Environment," in *Broadband Communications*, Casaca, A. (Ed.), Elsevier Science Publishers B.V., North Holland, IFIP Transactions C, vol. C–4, pp. 337–360 (1992).

Dighe, R. et al., "Congestion Avoidance Strategies in Broadband Packet Networks," *IEEE*, pp. 295–303 (Apr. 7–11, 1991).

Floyd, S. et al., "Increasing TCP's Initial Window," *Internet Engineering Task Force, Internet Draft*, 7 pages (Jul., 1997).

Floyd, S. et al., "Promoting the End–to–End Congestion in the Internet," *IEEE/ACM Transactions on Networking*, pp. 1–14 (Feb. 10, 1998).

Floyd, S. et al., "Random Early Detection Gateways for Congestion Avoidance," *IEEE/ACM Transactions on Networking*, 1(4):397–413 (Aug., 1993).

La Porta, T.F. et al., "Architecture, Features and Implementations Of High Speed Protocols," *GLOBECOM '91, IEEE Global Telecommunications Conf.*, pp. 1717–1721 (1991).

Mathis, M. et al. "The Macroscopic Behavior of the TCP Congestion Avoidance Algorithms," *Computer Communication Review* (a publication of ACM SIGCOMM) vol. 27, No. 3 (Jul., 1997) (ISSN#0146–4833).

Meister, B.W., "A Performance Study of the ISO Transport Protocol," *IEEE Transactions on Computers*, 40(3):253–262 (Mar., 1991).

Padhye, J. et al., "Modeling TCP Throghput: A Simple Model and its Empirical Validation," Department of Computer Science, University of Massachusetts, LGRC, Box 34610, Amherst, MA 01003–4610, USA, CMPSCI Tehcnical Report TR 98–008 (Feb. 11, 1998).

Request for Comments 1812 "Requirements IP Version 4 Routers," pp. 94–96 (1995).

Request for Comments 879 "The TCP Maximum Segment Size and Related Topics" pp. 1–11 (1983).

Request for Comments 896 "Congestion Control in IP/TCP Internetworks," 9 pages, (1984).

TCP/IP Illustrated, vol. 1: The Protocols, pp. 229–233, 235–238, 301–316 of W. Richard Stevens, Addison–Wesley Professional Computing Series Edition of 94, 10th Printing of Jul. 1997.

Williamson, C.L. et al., "Loss–Load Curves: Support for Rate–Based Congestion Control in High–Speed Datagram Networks," *Computer Communication Review*, (SIG-COMM '91 Conference, *Communications Architecture & Protocols*, Sep. 3–6, 1991, Zürich, Switzerland) 21 (4):17–28 (Sep., 1991).

Yang, Q. et al., "A Taxonomy for Congestion Control Algorithms in Packet Switching Networks," *IEEE Network Magazine*, vol. 9, No. 5, (Jul./Aug. 1995), provided on the Internet at http://www.ieee.org/comsoc/yang.html.

* cited by examiner

METHOD AND APPARATUS FOR PACKET NETWORK CONGESTION AVOIDANCE AND CONTROL

FIELD OF THE INVENTION

The present invention relates to computer networks generally and more particularly to congestion control and avoidance in computer networks.

BACKGROUND OF THE INVENTION

Various techniques are known for congestion control and avoidance in computer networks. Generally speaking congestion control is often effected as a last resort by "load shedding", which means that data packets are being discarded. Inasmuch as load shedding is extremely wasteful of network bandwidth resources as well as having a significantly negative impact on network performance, efforts have been made to avoid and control congestion without resorting to load shedding.

It is known to attempt to avoid congestion by allowing each node to begin data transmission with a single data segment, awaiting a timely acknowledgment and upon receipt thereof, allowing the node to transmit an increased number of data segments before awaiting a further acknowledgment, the data segments all being of the same size. For each successive received timely acknowledgment, the number of data segments transmitted subsequent thereto remains constant or is increased. The increase factor may be adaptive in response to sensed network congestion, in order to limit the load on the network. In certain cases, the increase factor may become negative or the transmission may be stopped for given intervals.

Various techniques are known whereby a network node controls the transmission rate of a sending node. Among others, routers send "choke" or "source quench" packets to sending nodes in order to slow down their transmission rate.

However, the technique most widely used to restrain the transmission rate of a transmitting node is to drop its packets on route and have the sending node wait in vain for acknowledgment of their receipt. After expiry of a timeout for the acknowledgment, the transmission rate gradually returns to its previous level, preferably in a manner described hereinabove.

The following U.S. patents, the disclosures of which are hereby incorporated by reference, are believed to represent the state of the art in network congestion avoidance and control:

U.S. Pat. No. 4,161,778, Synchronization control system for firmware access of high data rate transfer bus;
U.S. Pat. No. 4,270,205, Serial line communication system;
U.S. Pat. No. 4,317,134, Method and apparatus for pattern noise correction;
U.S. Pat. No. 4,366,573, Method for synchronizing code machines which are operated within the framework of a block transmission network;
U.S. Pat. No. 4,439,859, Method and system for retransmitting incorrectly received numbered frames in a data transmission system;
U.S. Pat. No. 4,475,192, Data packet flow control scheme for switching networks;
U.S. Pat. No. 4,485,438, High transfer rate between multi-processor units;
U.S. Pat. No. 4,589,111, Arq equipped data communication system;
U.S. Pat. No. 4,677,616, Flow control scheme for a switching network;
U.S. Pat. No. 4,691,314, Method and apparatus for transmitting data in adjustable-sized packets;
U.S. Pat. No. 4,697,281, Cellular telephone data communication system and method;
U.S. Pat. No. 4,703,478, Burst-switching method for an integrated communications system;
U.S. Pat. No. 4,707,693, Through-traffic priority protocol in a communications system;
U.S. Pat. No. 4,712,214, Protocol for handling transmission errors over asynchronous communication lines;
U.S. Pat. No. 4,726,036, Digital adaptive filter for a high throughput digital adaptive processor;
U.S. Pat. No. 4,727,537, Flow control arrangement for the transmission of data packets to a communication network;
U.S. Pat. No. 4,730,348, Adaptive data compression system;
U.S. Pat. No. 4,745,593, Arrangement for testing packet switching networks;
U.S. Pat. No. 4,769,815, Packet flow control method;
U.S. Pat. No. 4,771,424, Routing control method in a packet switching network;
U.S. Pat. No. 4,809,212, High throughput extended-precision multiplier;
U.S. Pat. No. 4,839,891, Method for controlling data flow
U.S. Pat. No. 4,845,656, System for transferring data between memories in a data-processing apparatus having a bitblt unit;
U.S. Pat. No. 4,845,664, On-chip bit reordering structure;
U.S. Pat. No. 4,851,990, High performance processor interface between a single chip processor and off chip memory means having a dedicated and shared bus structure;
U.S. Pat. No. 4,852,088, Packet-at-a-time reporting in a data link controller;
U.S. Pat. No. 4,852,127, Universal protocol data receiver;
U.S. Pat. No. 4,855,905, Multiprotocol I/O communications controller unit including emulated I/O controllers and tables translation of common commands and device addresses;
U.S. Pat. No. 4,860,193, System for efficiently transferring data between a high speed channel and a low speed I/O device;
U.S. Pat. No. 4,862,461, Packet switch network protocol;
U.S. Pat. No. 4,864,567, High throughput data communication system;
U.S. Pat. No. 4,873,662, Information handling system and terminal apparatus;
U.S. Pat. No. 4,875,161, Scientific processor vector file organization;
U.S. Pat. No. 4,882,674, Apparatus and method for control of one computer system by another computer system;
U.S. Pat. No. 4,888,684, Multiprocessor bus protocol;
U.S. Pat. No. 4,888,812, Document image processing system;
U.S. Pat. No. 4,897,835, High capacity protocol with multistation capability;

U.S. Pat. No. 4,905,282, Feature negotiation protocol and dynamically adjustable retraining sequence for a high speed half duplex modem;

U.S. Pat. No. 4,907,225, Data protocol controller;

U.S. Pat. No. 4,908,828, Method for error free message reception;

U.S. Pat. No. 4,926,415, Local area network system for efficiently transferring messages of different sizes;

U.S. Pat. No. 4,927,288, Road traffic network;

U.S. Pat. No. 4,929,939, High-speed switching system with flexible protocol capability, U.S. Pat. No. 4,930,159, Netbios name authentication;

U.S. Pat. No. 4,935,869, File transfer control method among a plurality of computer systems;

U.S. Pat. No. 4,939,731, Data transmission system with automatic repeat request;

U.S. Pat. No. 4,941,144, Data transmission device capable of adaptively varying a packet size without an increase in hardware;

U.S. Pat. No. 4,951,278, High-level data link control packet assembler/disassembler U.S. Pat. No. 4,953,162, Multipath local area network;

U.S. Pat. No. 4,961,221 Communication method and system with encryption of information;

U.S. Pat. No. 4,964,046, Harvard architecture microprocessor with arithmetic operations and control tasks for data transfer handled simultaneously;

U.S. Pat. No. 4,965,794, Telecommunications FIFO;

U.S. Pat. No. 4,967,344, Interconnection network for multiple processors;

U.S. Pat. No. 4,977,498, Data processing system having a data memory interlock coherency scheme;

U.S. Pat. No. 4,989,204, High throughput communication method and system for a digital mobile station when crossing a zone boundary during a session;

U.S. Pat. No. 4,992,926, Peer-to-peer register exchange controller for industrial programmable controllers;

U.S. Pat. No. 4,999,769, System with plural clocks for bidirectional information exchange between DMA controller and I/O devices via DMA bus;

U.S. Pat. No. 5,008,663, Communications systems;

U.S. Pat. No. 5,008,879, LAN with interoperative multiple operational capabilities;

U.S. Pat. No. 5,010,553, "High speed, error-free data transmission" system and method;

U.S. Pat. No. 5,014,186, Data-processing system having a packet transfer type input/output system;

U.S. Pat. No. 5,036,316, Method and apparatus for high speed linear shading in a raster graphics system;

U.S. Pat. No. 5,038,343, High speed digital packet switching system;

U.S. Pat. No. 5,042,029, Congestion control method and apparatus for end-to-end packet communication;

U.S. Pat. No. 5,053,987, Arithmetic unit in a vector signal processor using pipelined computational blocks;

U.S. Pat. No. 5,056,058, Communication protocol for predicting communication frame type in high-speed processing system;

U.S. Pat. No. 5,056,088, Apparatus and method for efficiently coupling digital signals to a communications medium in information packets;

U.S. Pat. No. 5,058,005, Computer system with high speed data transfer capabilities;

U.S. Pat. No. 5,058,110, Protocol processor;

U.S. Pat. No. 5,062,044, Temporary bus master for use in a digital system having asynchronously communicating sub-systems;

U.S. Pat. No. 5,063,494, Programmable data communications controller;

U.S. Pat. No. 5,065,314, Method and circuit for automatically communicating in two modes through a backplane;

U.S. Pat. No. 5,073,821, Orthogonal transform coding apparatus for reducing the amount of coded signals to be processed and transmitted;

U.S. Pat. No. 5,077,677, Probabilistic inference gate;

U.S. Pat. No. 5,077,732, LAN with dynamically selectable multiple operational capabilities;

U.S. Pat. No. 5,084,871, Flow control of messages in a local area network;

U.S. Pat. No. 5,084,877, High speed transport protocol;

U.S. Pat. No. 5,089,982, Two dimensional fast Fourier transform converter;

U.S. Pat. No. 5,097,331, Multiple block-size transform video coding using an asymmetric sub-band structure;

U.S. Pat. No. 5,103,447, High-speed ring LAN system;

U.S. Pat. No. 5,107,493, High-speed packet data network using serially connected packet and circuit switches;

U.S. Pat. No. 5,109,490, Data transfer using bus address lines;

U.S. Pat. No. 5,109,515, User and application program transparent resource sharing multiple computer interface architecture with kernel process level transfer of user requested services;

U.S. Pat. No. 5,113,392, Communication apparatus for reassembling packets received from network into message;

U.S. Pat. No. 5,113,494, High speed raster image processor particularly suited for use in an image management system;

U.S. Pat. No. 5,113,514, System bus for multiprocessor computer system;

U.S. Pat. No. 5,115,429, Dynamic encoding rate control minimizes traffic congestion in a packet network;

U.S. Pat. No. 5,115,431, Method and apparatus for packet communications signaling;

U.S. Pat. No. 5,115,432, Communication architecture for high speed networking;

U.S. Pat. No. 5,117,429, Packet switch for a transfer of data in asynchronous mode in a digital transmission network;

U.S. Pat. No. 5,119,367, Method and a node circuit for routing bursty data;

U.S. Pat. No. 5,121,216, Adaptive transform coding of still images;

U.S. Pat. No. 5,121,390, Integrated data link controller with synchronous link interface and asynchronous host processor interface;

U.S. Pat. No. 5,121,479, Early start mode data transfer apparatus;

U.S. Pat. No. 5,122,685, Programmable application specific integrated circuit and logic cell;

U.S. Pat. No. 5,124,941, Bit-serial multipliers having low latency and high throughput;

U.S. Pat. No. 5,124,991, Error correction for infrared data communication;

U.S. Pat. No. 5,126,842, Video signal encoding method with a substantially constant amount of transform data per transmission unit block;

U.S. Pat. No. 5,136,584, Hardware interface to a high-speed multiplexed link;

U.S. Pat. No. 5,142,532, Communication system;

U.S. Pat. No. 5,168,497, Packet communication processing method;

U.S. Pat. No. 5,191,583, Method and apparatus for effecting efficient transmission of data;

U.S. Pat. No. 5,193,151, Delay-based congestion avoidance in computer networks;

U.S. Pat. No. 5,224,095, Network control system and method;

U.S. Pat. No. 5,239,545, Channel access control in a communication system;

U.S. Pat. No. 5,257,258, Least time to reach bound" service policy for buffer systems;

U.S. Pat. No. 5,289,470, Flexible scheme for buffer space allocation in networking devices;

U.S. Pat. No. 5,303,344, Protocol processing apparatus for use in interfacing network connected computer systems utilizing separate paths for control information and data transfer;

U.S. Pat. No. 5,303,347, Attribute based multiple data structures in host for network received traffic;

U.S. Pat. No. 5,307,348, Scheduling in a communication system;

U.S. Pat. No. 5,315,584, System of data transmission by sharing in the time-frequency space with channel organization;

U.S. Pat. No. 5,339,368, Document image compression system and method;

U.S. Pat. No. 5,355,485, First processor for dividing long argument data into packets and storing total packet count and packets in shared buffer for subsequent execution by second processor;

U.S. Pat. No. 5,377,332, Bus arbitration algorithm and apparatus;

U.S. Pat. No. 5,379,296, Method and apparatus for interfacing a workstation to a plurality of computer platforms;

U.S. Pat. No. 5,384,770, Packet assembler;

U.S. Pat. No. 5,384,780, High speed modem, method and system for achieving synchronous data compression;

U.S. Pat. No. 5,400,329, Packet network and method for congestion avoidance in packet networks;

U.S. Pat. No. 5,406,643, Method and apparatus for selecting between a plurality of communication paths;

U.S. Pat. No. 5,425,051, Radio frequency communication network having adaptive parameters;

U.S. Pat. No. 5,452,299, Optimized transfer of large object data blocks in a tele-conferencing system;

U.S. Pat. No. 5,457,680, Data gateway for mobile data radio terminals in a data communication network;

U.S. Pat. No. 5,477,531, Method and apparatus for testing a packet-based network;

U.S. Pat. No. 5,481,735, Method for modifying packets that meet a particular criteria as the packets pass between two layers in a network;

U.S. Pat. No. 5,483,526, Resynchronization method and apparatus for local memory buffers management for an ATM adapter implementing credit based flow control;

U.S. Pat. No. 5,511,122, Intermediate network authentication;

U.S. Pat. No. 5,539,736, Method for providing LAN address discovery and terminal emulation for LAN-connected personal computer (PCs) using XEROX network system (XNS);

U.S. Pat. No. 5,541,919, Multimedia multiplexing device and method using dynamic packet segmentation;

U.S. Pat. No. 5,543,789, Computerized navigation system;

U.S. Pat. No. 5,561,806, Serial channel adapter;

U.S. Pat. No. 5,568,616, System and method for dynamic scheduling of 3D graphics rendering using virtual packet length reduction;

U.S. Pat. No. 5,570,346, Packet network transit delay measurement system;

U.S. Pat. No. 5,600,632, Methods and apparatus for performance monitoring using synchronized network analyzers;

U.S. Pat. No. 5,602,831, Optimizing packet size to eliminate effects of reception nulls;

U.S. Pat. No. 5,633,865, Apparatus for selectively transferring data packets between local area networks;

U.S. Pat. No. 5,633,867, Local memory buffers management for an ATM adapter implementing credit based flow control;

U.S. Pat. No. 5,664,075, Print job identification and synchronization between NetWare PServer and atlas RPrinter protocol gateway;

U.S. Pat. No. 5,671,430, Parallel data processing system with communication apparatus control;

U.S. Pat. No. 5,682,386, Data/voice/fax compression multiplexer;

U.S. Pat. No. 5,696,903, Hierarchical communications system using microlink, data rate switching, frequency hopping and vehicular local area networking;

U.S. Pat. No. 5,699,481, Timing recovery scheme for packet speech in multiplexing environment of voice with data applications;

U.S. Pat. No. 5,706,439, Method and system for matching packet size for efficient transmission over a serial bus; and RE34034, Cellular telephone data communication system and method The following publications are also considered to be relevant:

Lin, S., and Costello, D. J., Jr., Error Control Coding: Fundamentals and Applications. Englewood Cliffs, N. J.: Prentice-Hall, Inc., 1983, pp. 458–465;

Dighe, R., May, C. J., and Ramamurthy, G., "Congestion Avoidance Strategies in Broadband Packet Networks," in Proc. IEEE INFOCOM '91, Apr. 7–11, 1991, Bal Harbour, Fla., pp. 295–303;

Danthine, A., "A New Transport Protocol for the Broadband Environment," IFIP Transactions C, vol. C-4, 1992, pp. 337–360; also, presented at IFIP TC6 Workshop, Estoril, Portugal, Jan. 20–22, 1992;

Watson, Richard, "The Delta-t Transport Protocol: Features and Experience", Local Computer Networks, 1989 14th Conference. pp. 399–487;

Bocking, Stefan, "TEMPO: A lightweight Transport Protocol", Future Trends of Distributed Computing Systems, '91 Workshop. pp. 107–113;

Meister, Bernd, "A Performance Study of the ISO Transport Protocol", IEEE Trans on Computers. vol. 40 No. 3 March 1991. pp. 253–262;

La Porta et al. "Architectures, Features and Implementations of High Speed Protocols" GLOBE Corn '91: IEEE Global Telecommunications Conf pp. 1717–1721;

Comer et al, "A rate-based Congestion Avoidance & Control Scheme for Packet Switched Network"; Proceeding the 10th International Conf. on Distributed Computing Systems. pp. 390–397;

Yavatker et al, "Religram: —a communications abstraction for distributed processing" Proc. of the Third IEEE Symposium on Parallel & Distributed Processes. pp. 361–368;

Long et al, "Providing performance quarantees in an FDDI Network," Proceedings the 13th Intersational Conf. on Distributed Computing System. pp. 328–336;

"NETBLT: A High Throughput Transport Protocol" by Clark et al.; Laboratory for Computer Science, Massachusetts Institute of Technology; pp. 353–359;

"Goodness definition and goodness measure for high speed transport protocols for lightweight networking applications" by S. Isil, Lehigh University, 1992; pp. 1–213;

"Design and analysis of rate-based transport layer flow control protocol" by C. Yee-Hsiang, Ph.D.; Illinois Institute of Technology, 1990; pp. –124;

"A Survey of Light-Weight Transport Protocols for High-Speed Networks" by Doeringer et al; Transaction on Communications, vol. 38, No. 11, November 1990; pp. 2025–2039;

"Congestion Avoidance and Control" by Van Jacobson; University of California; Lawrence Berkeley Laboratory; pp. 314–329;

"Making Transport Protocols Fast" by Alfred C. Weaver; Department of Computer Science, University of Virginia; pp. 295–300;

"Comparison of Error Control Protocols for High Bandwidth-Delay Product Networks" by Feldmeier et al.; pp. 271–295;

"Dynamical Behavior of Rate-Based Flow Control Mechanisms" by Bolot et al.; Department of Computer Science, University of Maryland; pp. 35–49;

C. L. Williamson, et al., Loss-Load Curves: Support for Rate-Based Congestion Control in High-Speed Datagram Networks, Communications Architecture & Protocols,-SIGCOMM '91 Conference;

Computer Networks by A. S. Tannenbaum, 3rd Edition, 1996, Prentice-Hall, pp 374–395, Congestion Control Algorithms and pp. 536–539, TCP Congestion Control;

The Performance of TCP over ATM ABR and UBR services by Xiangrong Cai. Published on the Internet at http://www.cis.ohio-state.edu/~jain/cis788–97/tcp_over_atm/index.htm;

Optimization of TCP segment size for file transfer by R. M. Bournas, IBM Journal of Research & Development, Vol. 41, No. 3—Performance analysis and its impact on design;

TCP/IP Illustrated, vol 1: The Protocols. pp. 229–233, 235–238, 301–316 of W. Richard Stevens, Addison-Wesley Professional Computing Series Edition of 94, 10th printing of July 97;

Random Early Detection gateways for Congestion Avoidance. IEEE/ACM Transactions on Networking, V.1.N.4, August 1993, pp 397–413 by Floyd S., and Jacobson, V;

A Taxonomy for Congestion Control Algorithms in Packet Switching Networks. by Cui-Qing Yang and Alapati V. S. Reddy. IEEE Network Magazine July/August 1995, Vol. 9, Num. 5;

Request for Comments 879—The TCP Maximum Segment Size and Related Topics 1983;

Request for Comments 896—Congestion Control in IP/TCP internetworks, 1984;

Promoting the End-to-End Congestion Control in the Internet. S. Floyd and K. Fall. of Network Research Group of Lawrence Berkeley National Laboratory, Berkeley, Calif. Submitted to the IEEE/ACM Transactions on Networking, Feb. 10, 1998;

Request for Comments 1812—Requirements for IP Version 4 Routers. PP. 94–96, 1995;

TCP Vegas: New Techniques for Congestion Detection and Avoidance by L. S. Brakmo, S. W. O'Malley, and L. L. Peterson. Proceedings SIGCOMM 94 Conf. ACM; and Increasing TCP's Initial Windows by S. Floyd, M. Allman, C. Partridge Internet Engineering Task Force, INTERNET DRAFT, July 97;

The Macroscopic Behavior of the TCP Congestion Avoidance Algorithms. M. Mathis, J. Senke, J. Mahdavi of Pittsburgh Supercomputing Center and T. Ott of Bellcore. Computer Communication Review, a publication of ACM SIGCOMM, vol. 27, number 3, July 1997, ISSN# 0146-4833;

Modeling TCP Throughput: A Simple Model and its Empirical Validation. J. Padhye, V. Firoin, D. Towsley, J. Kurose, Department of Computer Sciences, University of Massachusetts, CMPSI Technical Report TR-98-008. ftp://ftp.cs.umass.edu/pbu/techrep/techreport/1998/um-cs-1998-008.ps.

SUMMARY OF THE INVENTION

The present invention seeks to provide improved congestion control and avoidance in computer networks.

There is thus provided in accordance with a preferred embodiment of the present invention a method for congestion control and avoidance in computer networks including the steps of:

sensing network congestion; and allowing a network node to transmit at least one basic data segment and thereafter to transmit additional data, the quantity of said additional data being a function of the basic data segment, wherein the size of the basic data segment is determined at least in part by sensed network congestion.

The term "sensing network congestion" is used throughout the specification and claims in a broad sense to mean inter alia sensing and predicting possible future network congestion. Prediction of possible future network congestion is possible, for example, by learning from a history of network load and/or by detecting an increase in the number of users or other indications. When possible future network congestion is predicted, the application of the methods and apparatus described herein is operative to prevent the development of future congestion altogether or at least to limit the evolving severity level that such future congestion would have otherwise reached Controlling the transmission rate of network nodes is an important technique to help prevent future congestion altogether and/or to limit the severity of such congestion.

There is also provided in accordance with a preferred embodiment of the present invention apparatus for congestion control and avoidance in computer networks including:

a network congestion sensor; and a node transmission controller, allowing a network node to transmit a basic data segment and thereafter to transmit additional data, the quantity of which is a function of the basic data segment, wherein the size of the basic data segment is determined at least in part by sensed network congestion.

There is additionally provided in accordance with a preferred embodiment of the present invention, a method for congestion control and avoidance in computer networks including the steps of:

indicating possible future network congestion; and allowing a network node to transmit a basic data segment having a size, and thereafter to transmit additional data, the quantity of which is a function of the basic data segment, wherein the size of the basic data segment is determined at least in part so as to reduce anticipated future network congestion.

There is further provided in accordance with a preferred embodiment of the present invention, apparatus for congestion control and avoidance in computer networks including:

a future network congestion predictor; and a node transmission controller, allowing a network node to transmit a basic data segment and thereafter to transmit additional data, the quantity of which is a function of the basic data segment, wherein the size of the basic data segment is determined at least in part to avoid predicted future congestion.

The phrase "data segment", as used throughout the specification and claims, is commonly used within the TCP/IP protocol environment but it is not intended to limit the present invention to that environment through the use of this phase. Accordingly, the phrase "data segment" in the specification and claims is to be understood in a sense not limited to the TCP/IP protocol environment.

In accordance with one embodiment of the invention, the size of the basic data segment is limited by an intermediate node, such as a router or switch, which provides to a transmitting node false information regarding a maximum basic data segment size that a receiving node wishes to receive, in response to sensed congestion.

The terms "router" and "switch" are used throughout the specification and claims in a broad sense to mean any suitable intermediate node, such as a router, switch or firewall, bandwidth management device or traffic shapper device which is not the final destination of the data.

In accordance with another embodiment of the invention, the size of the basic data segment is determined by a sending node which senses congestion between itself and a receiving node and adjusts the basic data segment size in response to sensed congestion.

In accordance with another embodiment of the invention, the size of the basic data segment is limited by a receiving node which provides to the sending node information regarding maximum basic data segment size that it wishes to receive in response to sensed congestion.

In accordance with yet another embodiment of the invention, the size of the basic data segment is determined by a sending node which receives information from an external indicator, which may be a congestion indicator and/or a network management device and adjusts the basic data segment size in response to the information received.

In accordance with another embodiment of the invention, the size of the basic data segment is determined by a sending node which receives congestion information from a router or other intermediate node via the receiving node and adjusts the basic data segment size in response to the received congestion information.

There is thus provided in accordance with a preferred embodiment of the present invention a method for controlling the transmission rate of a network node including the steps of:

Allowing a network node to transmit at least one basic data segment having a size and thereafter to transmit additional data, the quantity of said additional data being a function of the size of the basic data segment, Wherein the size of the basic data segment is determined at least in part by an intermediate node such as a router or a switch or a bandwidth management device disposed between the communicating nodes in a network, which provides to the transmitting node false information regarding a maximum basic data segment size that a receiving node wishes to receive.

In accordance with a preferred embodiment of the present invention the present invention is embodied in a TCP/IP protocol and varies the size of the basic data segment employed therein. According to the TCP/IP protocol, the TCP basic data segment is bound in size by the size indicated in the Maximum Segment Size (MSS) field which may be contained in the SYN segment that is provided by the receiving node to the data sending node. The inclusion of the MSS field in the SYN segment is optional. If the MSS option is not employed, the sending node employs a predetermined segment size.

BRIEF DESCRIPTION OF THE DRAWINGS

The present invention will be understood and appreciated more fully from the following detailed description in which.

DETAILED DESCRIPTION OF PREFERRED EMBODIMENTS

Figure 1:
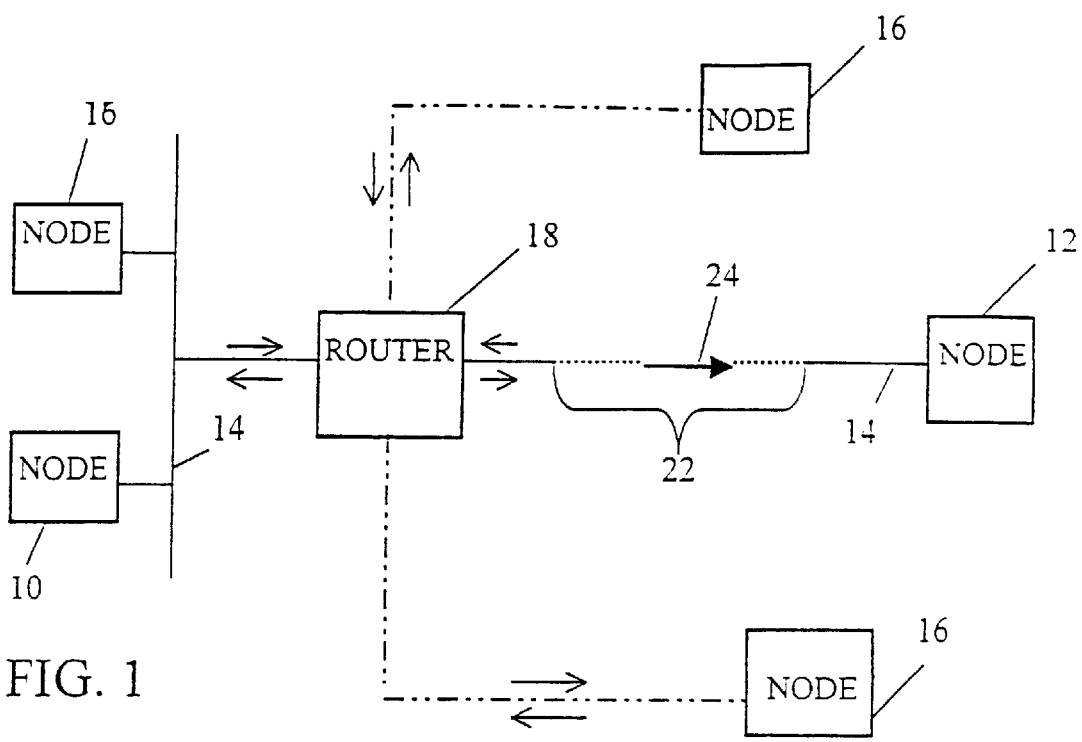
FIG. 1 is a simplified block diagram illustration of apparatus for congestion control and avoidance in computer networks constructed and operative in accordance with a preferred embodiment of the present invention.

Reference is now made to FIG. 1, which is a simplified block diagram illustration of apparatus for congestion control and avoidance in computer networks constructed and operative in accordance with a preferred embodiment of the present invention. First and second nodes 10 and 12 are connected to a computer network 14 along with one or more additional nodes 16. Normally, the network is connected to a large number of such nodes. Generally speaking, the extent of congestion in a computer network can be determined by one or more of the following: the utilization of memory buffers in intermediate nodes, the rate at which data packets are being discarded, the round trip times of packets between nodes, queue sizes in network nodes, number of retransmitted packets and utilization of other indicators.

The network path between nodes 10 and 12 is illustrated for simplicity as including at least one router 18 and a network pathway 22. Other network pathways leading to various nodes 16 are also provided. In the illustrated embodiment, router 18 senses congestion in the direction indicated by arrow 24 along the network pathway 22 or elsewhere along the pathway interconnecting router 18 and node 12, it being appreciated that router 18 could alternatively or additionally sense congestion between itself and node 10 or within the router itself.

The term "sensing network congestion" is used throughout the specification and claims in a broad sense to mean inter alia sensing and predicting possible future network congestion. Prediction of possible future network congestion is possible, for example, by learning from a history of network load and/or by detecting an increase in the number of users or other indications. When possible future network congestion is predicted, the application of the methods and apparatus described herein is operative to prevent the development of future congestion altogether or at least to limit the evolving severity level that such future congestion would have otherwise reached. Controlling the transmission rate of network nodes is an important technique to help prevent future congestion altogether and/or to limit the severity of such congestion.

At the beginning of a data communication session between nodes 10 and 12, each node, acting as a sending node, typically transmits to the other, acting as a receiving node, a basic data segment of a size which does not exceed the size that the receiving node wishes to receive. However, before each node transmits the basic data segment, it normally receives a notification from the corresponding receiving node of the maximum size of the basic data segment that the receiving node wishes to receive. Such notifications are normally exchanged during initial establishment of a connection between the nodes. Alternatively, such notification may be obviated in cases which the contents of a preceding notification may have been stored at the sending node upon earlier communication between the sending node and the receiving node. As a further alternative, notwithstanding such storage, the notifications are nevertheless provided. As an additional alternative, when such notifications are not sent for any reason, the sending node sends a basic data segment of a predetermined size.

The basic data segment may include one or more packets of a desired size. Preferably, but not necessarily, the basic data segment comprises a single packet. In such a case, determination of the size of the basic data segment is equivalent to determination of the size of the packet.

In accordance with a preferred embodiment of the present invention, router 18 is operative to transparently replace the notification sent by the receiving node with a substitute notification which, under congestion conditions, indicates a basic segment size which is smaller than that in the original notification. This substitution causes the transmitting node to send a basic segment of smaller size than it would otherwise have done and thus causes the basic segment size to be adaptively related to the state of congestion of the network path.

Figure 6A:
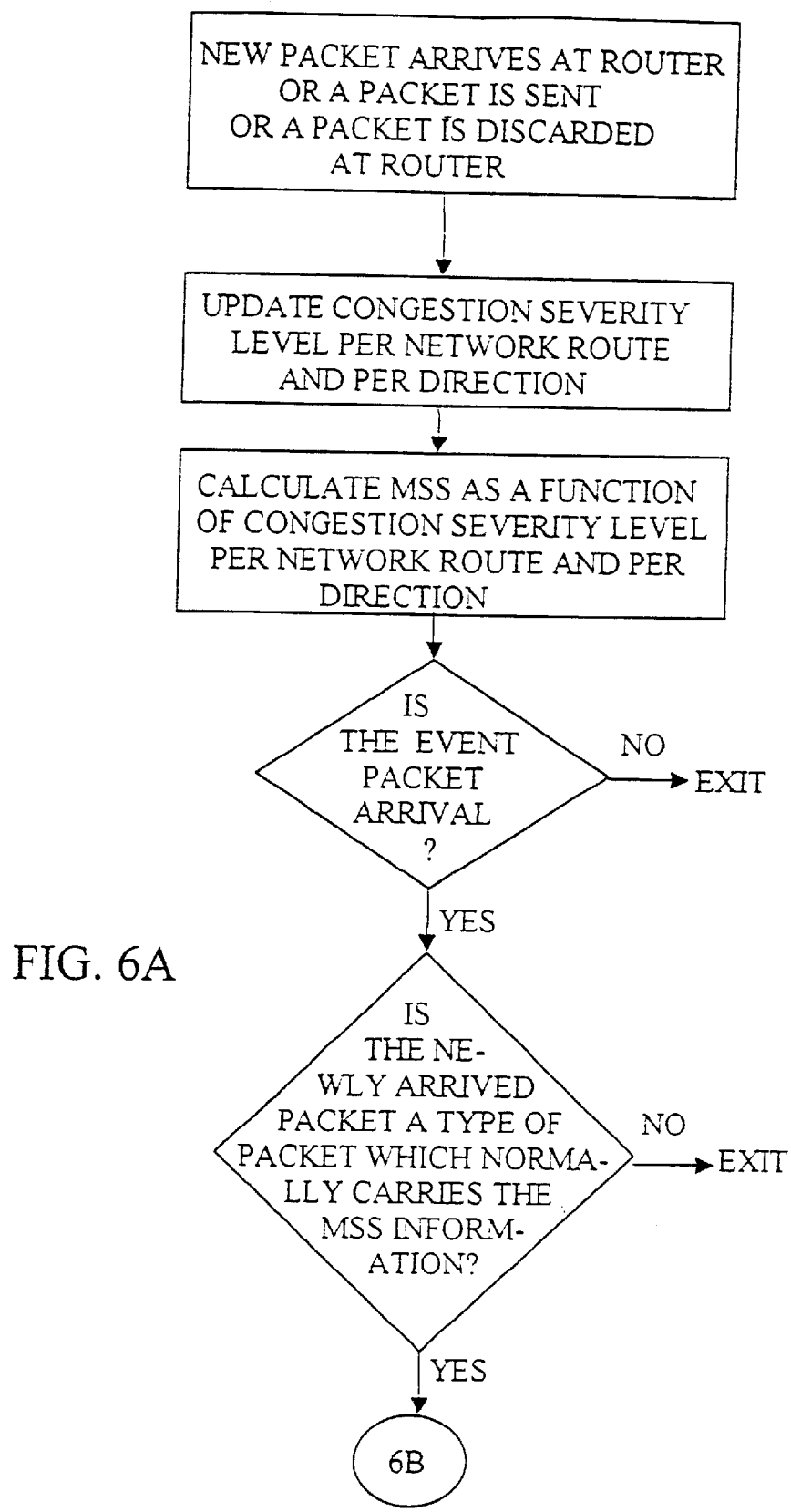
FIGS. 6A and 6B are together a simplified flow chart illustration of the operation of the embodiment of FIG. 1.
Figure 6B:
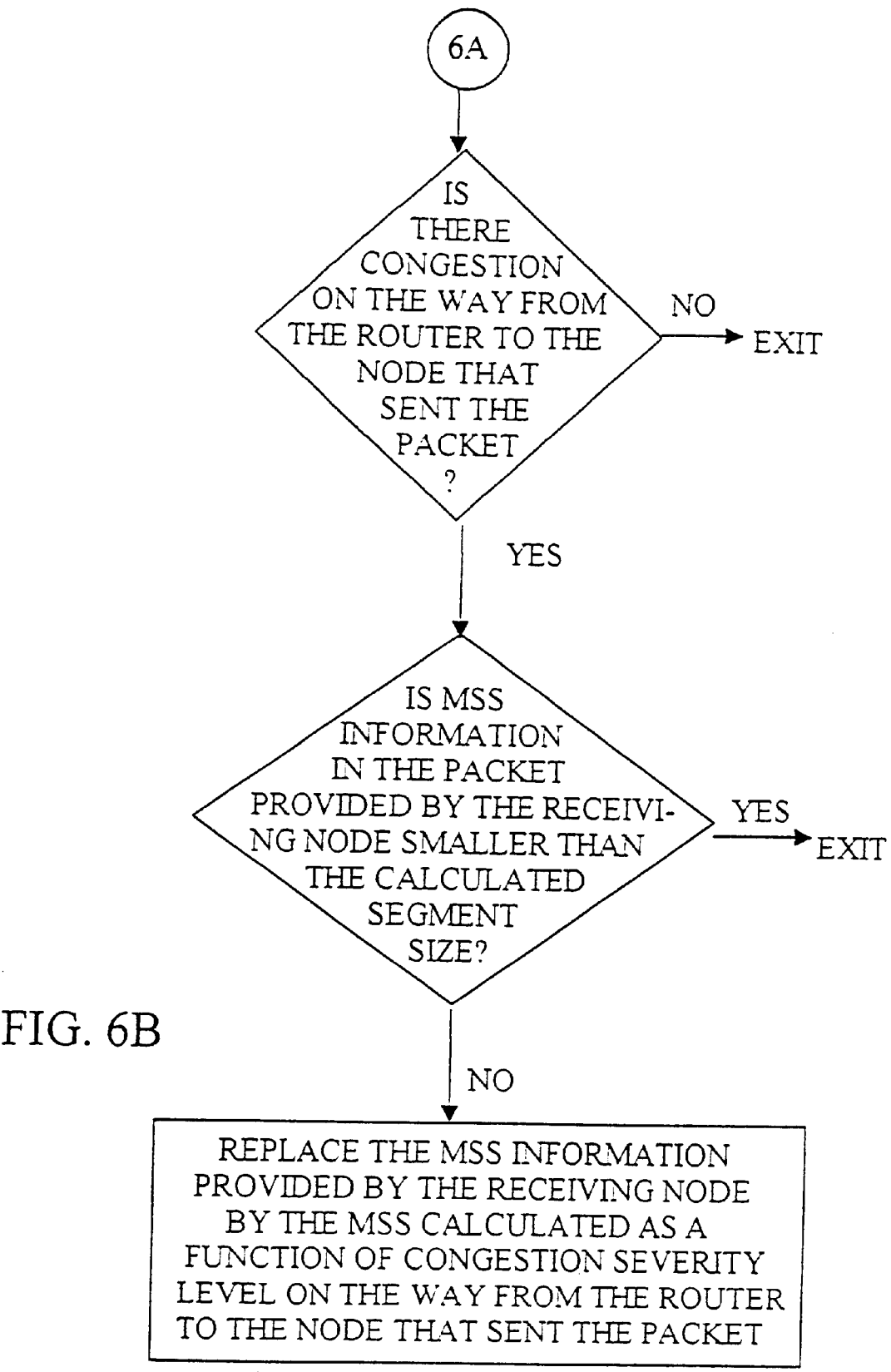

Reference is now made to FIGS. 6A and 6B, which together constitute a simplified flow chart illustration of the operation of the embodiment of FIG. 1 and specifically of the operation of an intermediate node, such as router 18, in the context of the present invention. The operation of router 18 is typically initialized by one of three events: arrival of a new packet, sending a packet or discarding a packet. Each of the foregoing three events is capable of changing the level of congestion severity sensed by the router. It is appreciated that the operation of router 18 in the context of the present invention may alternatively be initialized in another manner. It is further appreciated that instead of router 18, the intermediate node may be any other suitable type of device, including, for example, a dedicated intermediate node whose sole operation is in the context of the present invention.

In the illustrated embodiment, following initialization, typically as aforesaid, the router 18 is operative to update the level of congestion severity for each direction along each network route. Thereafter, router 18 calculates the maximum segment size that may be sent by the sending node in a given direction along a given network route without aggravating congestion and preferably also in order to relieve such congestion. The maximum segment size is determined by the router as a function of the congestion severity level for each direction and each network route. It is appreciated that normally as the congestion severity level increases, the maximum segment size decreases accordingly.

If the initializing event was not the arrival of the packet, the router activity in the context of the present invention is completed.

If the initializing event was the arrival of a packet of the type that normally does not carry information as to the maximum segment size, the router activity in the context of the present invention is completed.

If the initializing event was the arrival of a packet of the type that normally does carry information as to the maximum segment size, the router investigates whether there is a non-zero congestion severity level on the network route in a direction from the router to the node that sent the packet. If no, the router activity in the context of the present invention is completed. If yes, the router 18 compares the maximum segment size information in the received packet with the maximum segment size calculated by the router above.

It is appreciated that other types of initializing events may occur and be dealt with by the present invention in accordance with the teaches described herein.

If the maximum segment size information in the received packet does not indicate a larger maximum segment size than that calculated, the router activity in the context of the present invention is completed. If the maximum segment size information in the received packet does indicate a larger maximum segment size than that calculated, the router uses the above-calculated maximum segment size information to replace the maximum segment size information in the received packet and transmits the received packet, thus modified, to its destination.

It is appreciated that in the absence of maximum segment size information in received packets suitable for carrying maximum segment size information, it is assumed that information relating to the predetermined stored segment size is intended to be used by the sending node receiving such packets. In such a case, in the presence of congestion, the router adds maximum segment size information to packets which are sent to the sending node, which information indicates a maximum segment size which is smaller than the predetermined maximum segment size and causes the sending node to use this information.

It is a particular feature of the present invention that in an embodiment where there are a plurality of routers or other intermediate nodes located at various locations along a network path and the various routers or other intermediate nodes sense various different levels of congestion thereat, the most severe congestion level is automatically communicated along the network path to the sending node, without there being any need for coordinating the operation of the routers or other intermediate nodes in this regard.

In accordance with another preferred embodiment of the present invention, router 18 is operative to add congestion information to a packet on its way to the receiving node. This congestion information is subsequently conveyed by the receiving node to the sending node. Subsequent to the receipt of the congestion information, the sending node transmits segments whose sizes are smaller then they would have been otherwise and thus causes the segment sizes to be adaptively related to the state of congestion of the network path.

Figure 10:
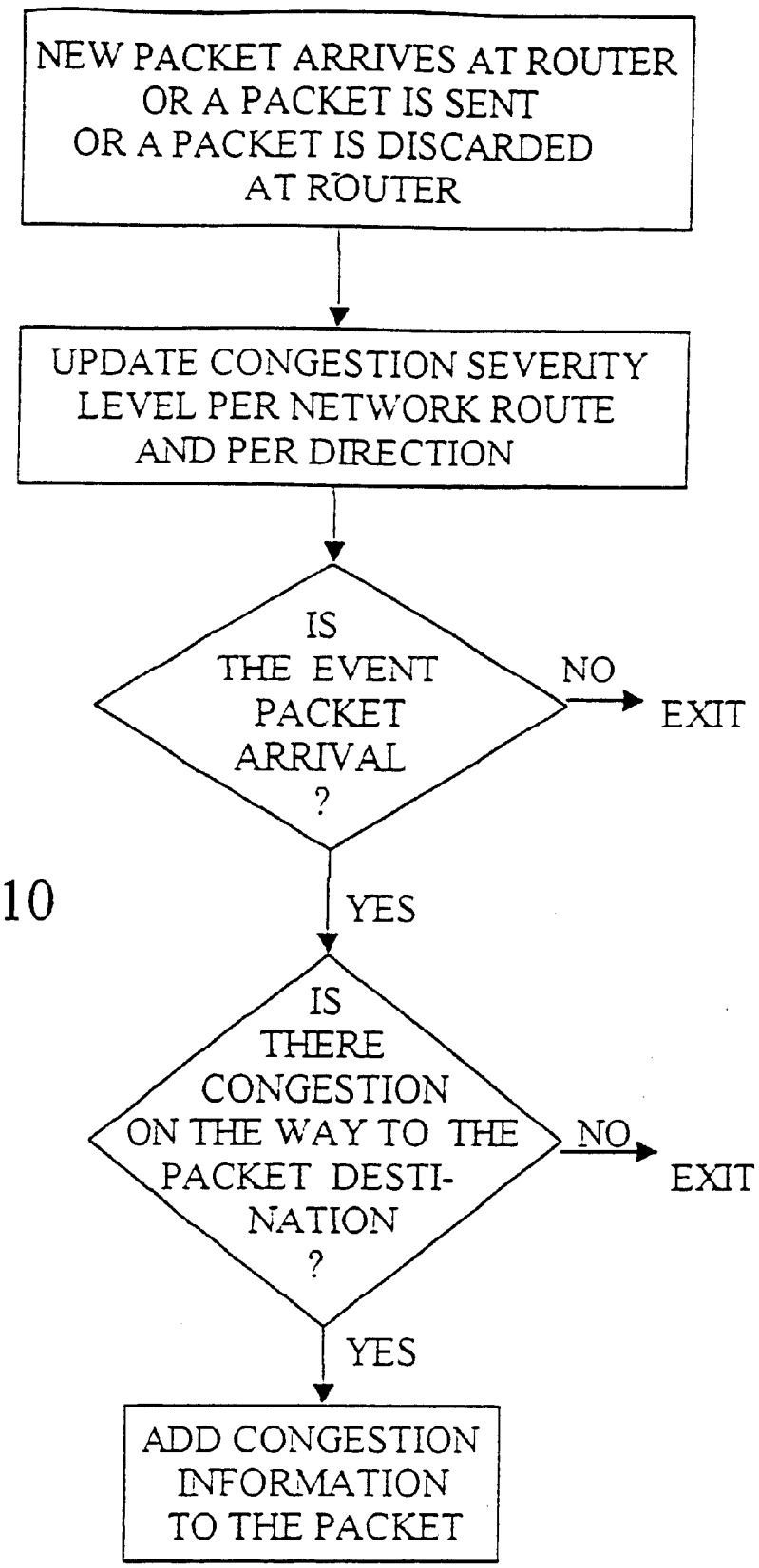
FIG. 10 is a simplified flow chart illustration of an alternative mode of operation of the embodiment of FIG. 1.

Reference is now made to FIG. 10, which constitutes a simplified flow chart illustration of the operation of this alternative embodiment of the invention and specifically illustrates the operation of an intermediate node, such as router 18, in the context of this alternative embodiment. The operation of router 18 is typically initialized by one of three events: arrival of a new packet, sending a packet or discarding a packet. Each of the foregoing three events is capable of changing the level of congestion severity sensed by the router.

It is appreciated that the operation of router 18 in the context of the present invention may alternatively be initialized in another manner. It is further appreciated that instead of router 18, the intermediate node may be any other suitable type of device, including, for example, a dedicated intermediate node whose sole operation is in the context of the present invention.

In the illustrated embodiment of FIG. 10, following initialization, typically as aforesaid, the router 18 is operative to update the level of congestion severity for each direction along each network route.

If the initializing event was not the arrival of the packet, the router activity in the context of the present invention is completed.

If the initializing event was the arrival of a packet, the router investigates whether there is a non-zero congestion severity level on the network route in a direction from the router to the packet destination. If no, the router activity in the context of the present invention is completed. If yes, the router 18 adds congestion information to the packet on its way to the receiving node.

The congestion information added to the packet on its way to the receiving node is conveyed to the sending node by the receiving node. This may be achieved, for example, by the receiving node copying the congestion information into an acknowledgment packet sent from the receiving node to the sending node.

The sending node, upon receipt of the congestion information, adjusts the sizes of the data segments transmitted by it in accordance with the congestion severity level indicated by the router. It is appreciated that normally as the congestion severity level increases, the size of the data segments decreases accordingly.

It is a particular feature of the present invention that in an embodiment where there are a plurality of routers located at various locations along a network path and the various routers sense various different levels of congestion thereat, the most severe congestion level sensed by a router is automatically communicated along the network path to the receiving node and subsequently conveyed to the sending node, without there being any need for coordinating the operation of the routers in this regard.

Figure 2:
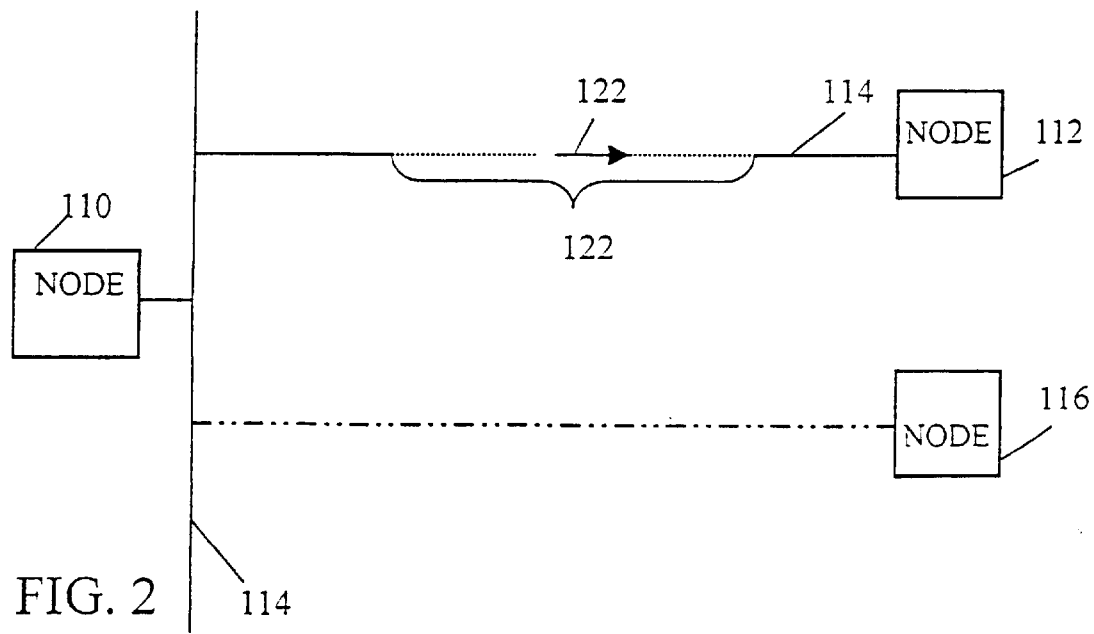
FIG. 2 is a simplified block diagram illustration of apparatus for congestion control and avoidance in computer networks constructed and operative in accordance with another preferred embodiment of the present invention.

Reference is now made to FIG. 2, which is a simplified block diagram illustration of apparatus for congestion control and avoidance in computer networks constructed and operative in accordance with another preferred embodiment of the present invention First and second nodes 110 and 112 are connected to a computer network 114 along with one or more additional nodes 116. Normally, the network is connected to a large number of such nodes.

The network path between nodes 110 and 112 is illustrated for simplicity as including a network pathway 122. Other network pathways leading to various nodes 116 are also provided. In the illustrated embodiment, a sending node, typically node 110, senses congestion in the direction indicated by arrow 124 along the network pathway 122 or elsewhere along the pathway interconnecting node 110 and any of nodes 116.

At the beginning of data communication between nodes 110 and 112, each node typically transmits to the other a basic data segment of a size which does not exceed the size that the receiving node wishes to receive. However, before each node transmits the basic data segment it normally receives a notification from the corresponding receiving node of the maximum size of basic data segment that the receiving node wishes to receive.

Such notifications are normally exchanged during initial establishment of a connection between the nodes. Alternatively, such notification may be obviated in cases which the contents thereof may have been stored at the sending node upon earlier communication between the sending node and the receiving node. As a further alternative, notwithstanding such storage, the notifications are nevertheless provided. As an additional alternative, when such notifications are not sent for any reason, the sending node sends a basic data segment of a predetermined size.

The basic data segment may include one or more packets of a desired size. Preferably, but not necessarily, the basic data segment comprises a single packet. In such a case, determination of the size of the basic data segment is equivalent to determination of the size of the packet.

Figure 7:
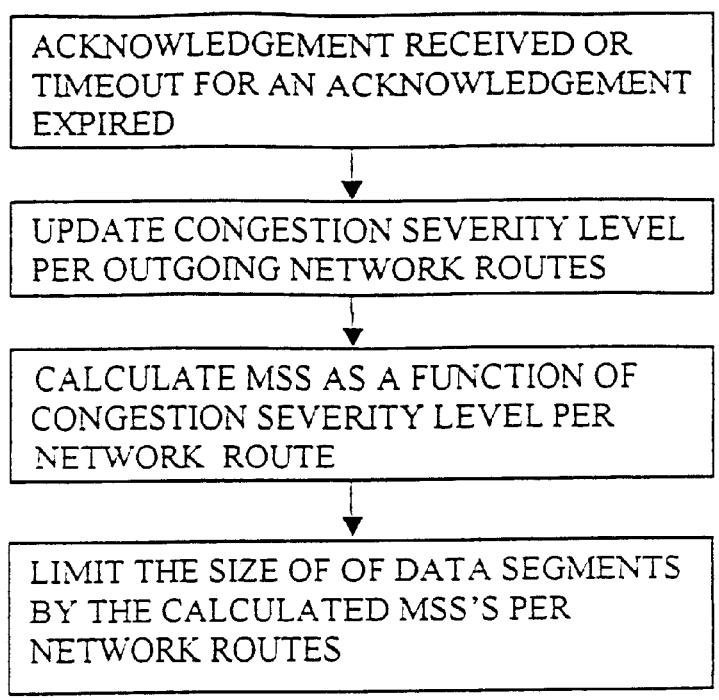
FIG. 7 is a simplified flow chart illustration of the operation of the embodiment of FIG. 2.

Reference is now made to FIG. 7, which is a simplified flow chart illustration of the operation of the embodiment of FIG. 2. In this embodiment, the initializing event is the arrival of an acknowledgment or the expiry of a timeout period established by the sending node, typically node 110, for receipt of an acknowledgment from the intended receiving node, typically node 112, following transmission of a packet to node 112. Other types of initializing events may also take place.

Following the initializing event, the sending node, typically node 110, is operative to update the level of congestion severity along each network route. Thereafter, the sending node calculates the maximum segment size that may be sent by the sending node along a given network route without aggravating congestion and preferably also in order to relieve such congestion. The maximum segment size is determined as a function of the congestion severity level for each network route. It is appreciated that normally as the congestion severity level increases, the maximum segment size decreases accordingly.

Figure 5:
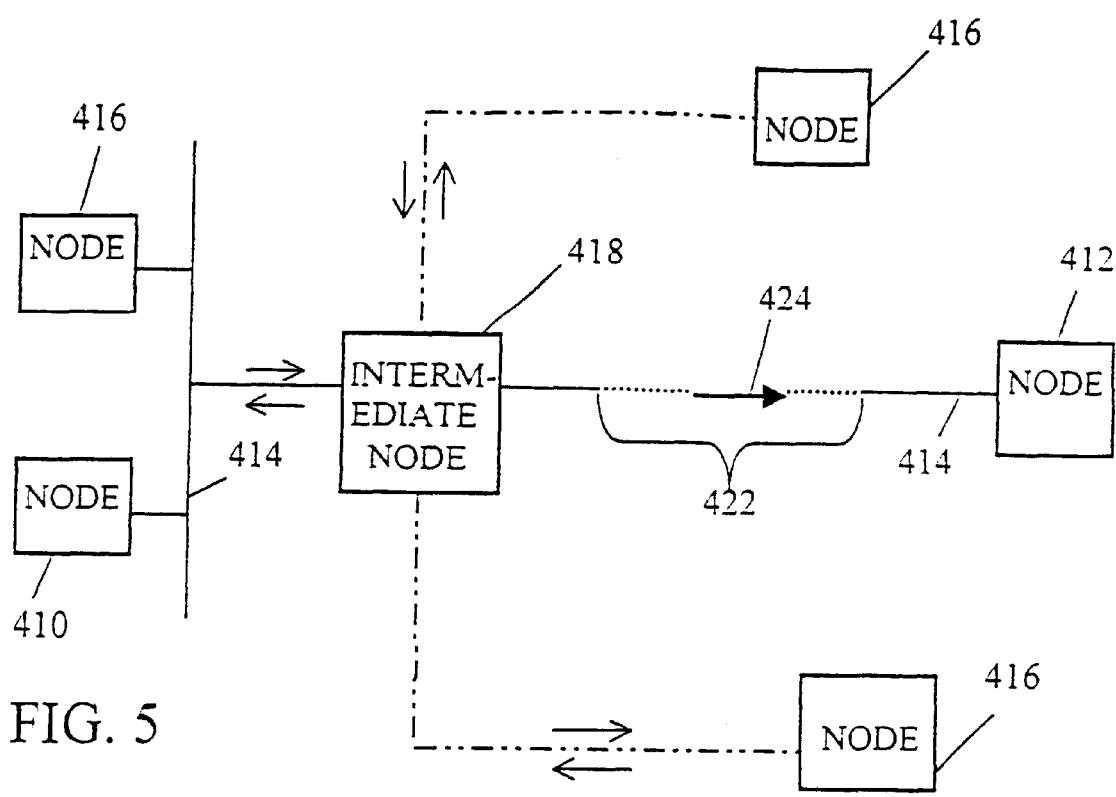
FIG. 5 is a simplified block diagram illustration of the apparatus for transmission rate control of a network node constructed and operative in accordance with a preferred embodiment of the present invention.

Thereafter, the data sending node ensures that the basic data segment sizes used for transmission in various communication sessions do not exceed the maximum segment size (MSS) calculated for the network routes selected for the communication sessions. The operation set forth in FIG. 5 is normally repeated for each separate communication session.

Figure 3:
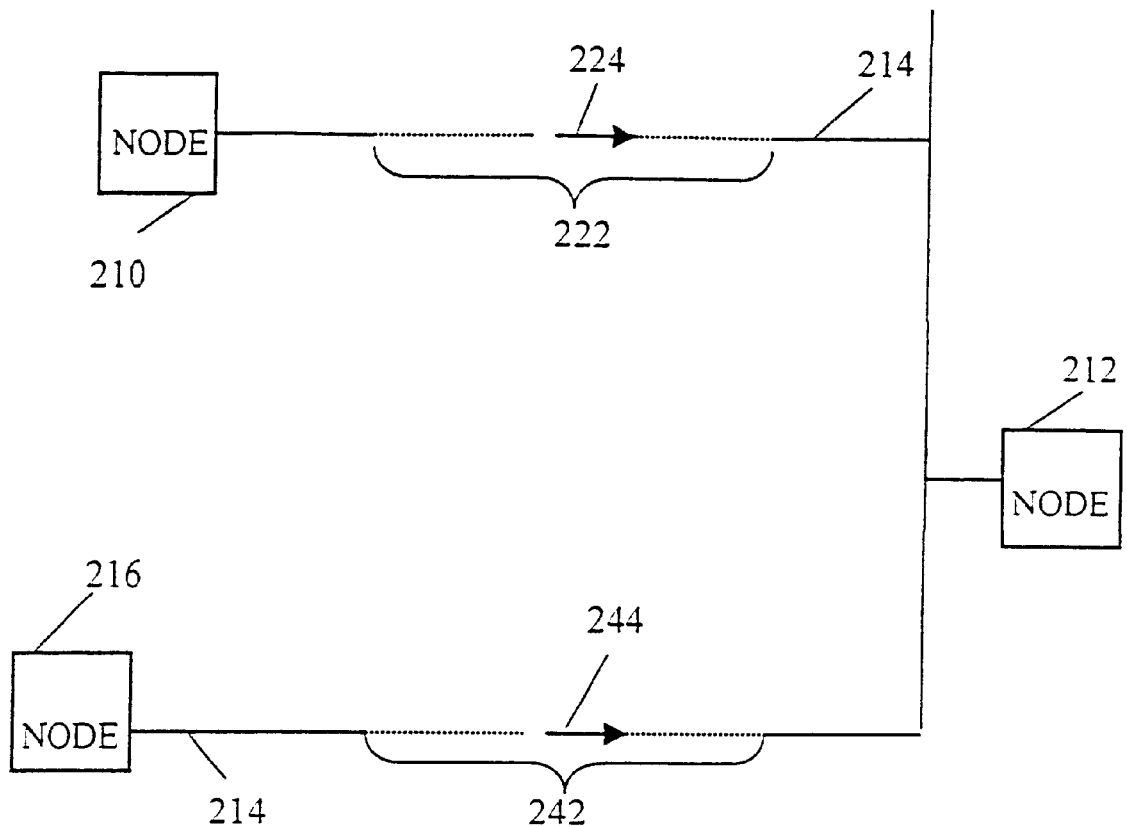
FIG. 3 is a simplified block diagram illustration of apparatus for congestion control and avoidance in computer networks constructed and operative in accordance with yet another preferred embodiment of the present invention.

Reference is now made to FIG. 3, which is a simplified block diagram illustration of apparatus for congestion control and avoidance in computer networks constructed and operative in accordance with yet another preferred embodiment of the present invention. First and second nodes 210 and 212 are connected to a computer network 214 along with one or more additional nodes 216. Normally, the network is connected to a large number of such nodes.

The network path between nodes 210 and 212 is illustrated for simplicity as including a network pathway 222. Other network pathways 242 from various nodes 216 to node 212 are also provided In the illustrated embodiment, a receiving node, typically node 212, senses congestion in the direction indicated by arrow 224 along the network pathway 222 or elsewhere in a direction 244 along a pathway 242 interconnecting node 212 and any of nodes 216.

At the beginning of data communication between nodes 210 and 212, each node typically transmits to the other a basic data segment of a size which does not exceed the size that the receiving node wishes to receive. However, before each node transmits the basic data segment it normally receives a notification from the corresponding receiving node of the maximum size of basic data segment that the receiving node wishes to receive.

Such notifications are normally exchanged during initial establishment of a connection between the nodes. Alternatively, such notification may be obviated in cases which the contents thereof may have been stored at the sending node upon earlier communication between the sending node and the receiving node. As a further alternative, notwithstanding such storage, the notifications are nevertheless provided.

As an additional alternative, when such notifications are not sent for any reason, the sending node sends a basic data segment of a predetermined size.

The basic data segment may include one or more packets of a desired size. Preferably, but not necessarily, the basic data segment comprises a single packet. In such a case, determination of the size of the basic data segment is equivalent to determination of the size of the packet.

Figure 8:
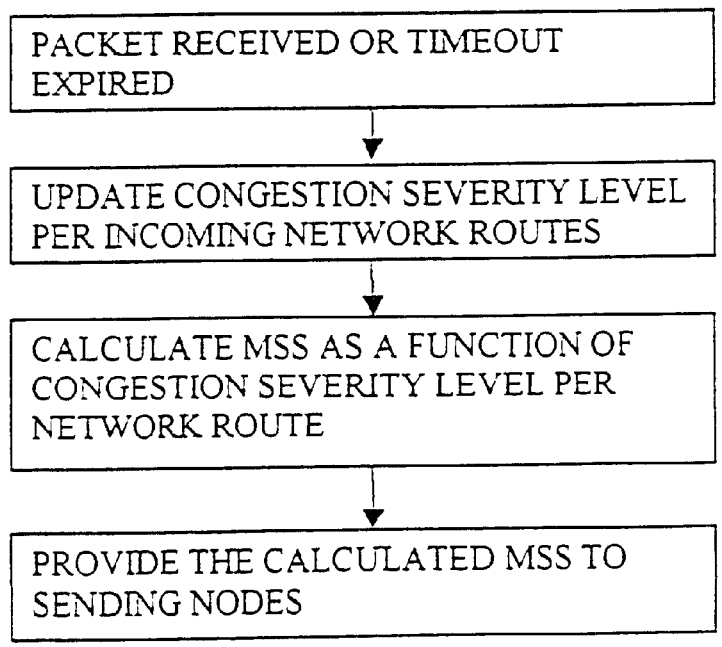
FIG. 8 is a simplified flow chart illustration of the operation of the embodiment of FIG. 3.

Reference is now made to FIG. 8, which is a simplified flow chart illustration of the operation of the embodiment of FIG. 3. In this embodiment, the initializing event is the arrival of a packet at receiving node 212 or the expiry of a timeout period established by the receiving node, typically node 212, for receipt of a response to a probing transmission initiated by the receiving node in order to determine the existence and extent of congestion along a given network path 224. Other types of initializing events may also take place.

Following the initializing event, the receiving node, typically node 212, is operative to update the level of congestion severity along each network route. Thereafter, the receiving node calculates the maximum segment size (MSS) that may be sent by the sending node along a given network route without aggravating congestion and preferably also in order to relieve such congestion. The maximum segment size is determined as a function of the congestion severity level for each network route. It is appreciated that normally as the congestion severity level increases, the maximum segment size decreases accordingly.

Thereafter, the receiving node 212 communicates with the sending node to ensure that the basic data segment sizes used for transmission in various communication sessions do not exceed the maximum segment size (MSS) calculated for the network routes selected for the communication sessions. The operation set forth in FIG. 8 is normally repeated for each separate communication session.

Figure 4:
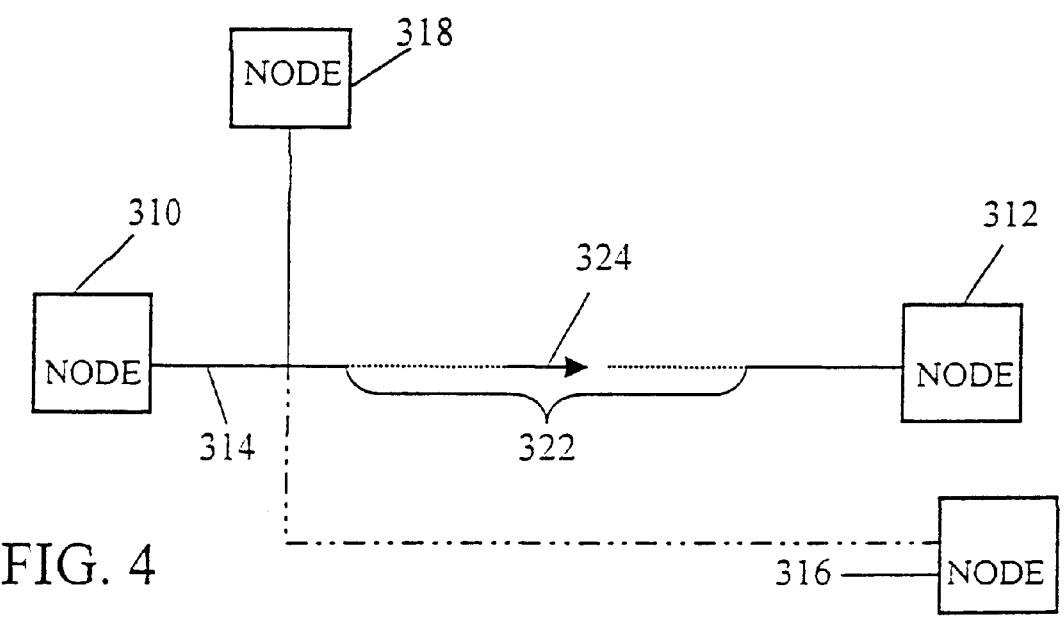
FIG. 4 is a simplified block diagram illustration of apparatus for congestion control and avoidance in computer networks constructed and operative in accordance with still another preferred embodiment of the present invention.

Reference is now made to FIG. 4, which is a simplified block diagram illustration of apparatus for congestion control and avoidance in computer networks constructed and operative in accordance with still another preferred embodiment of the present invention. First and second nodes 310 and 312 are connected to a computer network 314 along with one or more additional nodes 316. Normally, the network is connected to a large number of such nodes. Generally speaking, the extent of congestion in a computer network can be determined by the utilization of memory buffers in intermediate nodes, by the rate at which data packets are being discarded, by the round trip times of packets between nodes and utilization of other indicators.

A network monitor 318 is connected to the network 314 and communicates with nodes 310 and 312 via the network 314. The network path between nodes 310 and 312 is illustrated for simplicity as including a network pathway 322. Other network pathways leading to various nodes 316 are also provided. In the illustrated embodiment, network monitor 318 senses congestion in the direction indicated by arrow 324 along the network pathway 322 or elsewhere along the pathway interconnecting nodes 310 and 312. Network monitor 318 is preferably embodied in a computer node. Alternatively it may be embodied in an intermediate node, such as a router or in a combination computer node and intermediate node.

At the beginning of data communication between nodes 310 and 312, each node typically transmits to the other a basic data segment of a size which does not exceed the size that the receiving node wishes to receive. However, before each node transmits the basic data segment it normally receives a notification from the corresponding receiving node of the maximum size of basic data segment that the receiving node wishes to receive.

Such notifications are normally exchanged during initial establishment of a connection between the nodes. Alternatively, such notification may be obviated in cases which the contents thereof may have been stored at the sending node upon earlier communication between the sending node and the receiving node. As a further alternative, notwithstanding such storage, the notifications are nevertheless provided. As an additional alternative, when such notifications are not sent for any reason, the sending node sends a basic data segment of a predetermined size.

The basic data segment may include one or more packets of a desired size. Preferably, but not necessarily, the basic data segment comprises a single packet. In such a case, determination of the size of the basic data segment is equivalent to determination of the size of the packet.

In accordance with a preferred embodiment of the present invention, network monitor 318 is operative to communicate with the sending node to override the notification sent by the receiving node with a substitute notification, but only in such cases where the network monitor indicates a basic segment size which is smaller than that in the original notification. This substitution causes the transmitting node to send a basic segment of smaller size than it would otherwise have done and thus causes the basic segment size to be adaptively related to the state of congestion of the network path.

Figure 9:
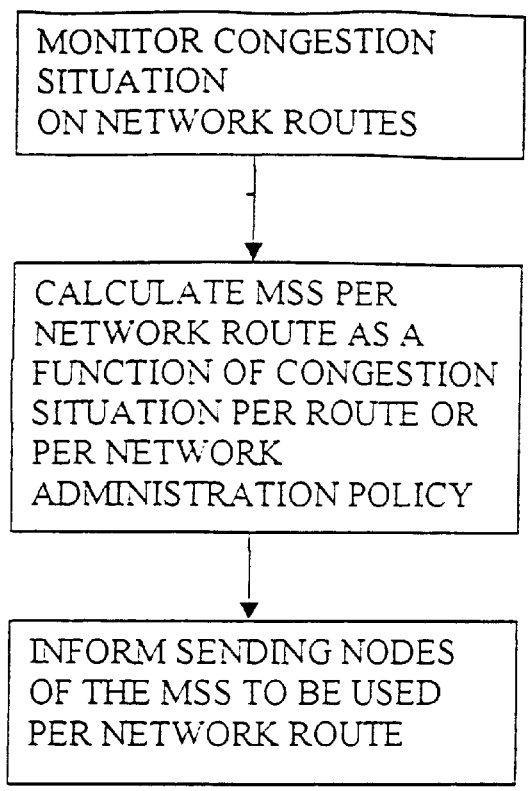
FIG. 9 is a simplified flow chart illustration of the operation of the embodiment of FIG. 4.

Reference is now made to FIG. 9, which is a simplified flow chart illustration of the operation of the embodiment of FIG. 4 and specifically of the operation of a network monitor 318 in the context of the present invention. The operation of network monitor 318 does not require initialization and may proceed continuously.

In the illustrated embodiment, the network monitor 318 is operative to update the level of congestion severity for each direction along each network route and to communicate this level to the various computer nodes, such as node 310. Upon receipt of this information, a sending node, such as node 310 calculates the maximum segment size that may be sent in a given direction along a given network route without aggravating congestion and preferably also in order to relieve such congestion. The maximum segment size is determined as a function of the congestion severity level for each direction and each network route. It is appreciated that normally as the congestion severity level increases, the maximum segment size decreases accordingly.

It is appreciated that in the absence of maximum segment size information in received packets, it is assumed that predetermined stored segment size information is intended to be used by the sending node. In such a case, in the presence of congestion, the network monitor sends a packet to the sending node, which contains information indicating a maximum segment size which is smaller than the predetermined maximum segment size and causes the sending node to use this information.

According to an alternative embodiment of the present invention, the network monitor may itself calculate the maximum segment size (MSS) and communicate it to the sending node.

It is a particular feature of the present invention that in an embodiment where there are a plurality of network monitors located at various locations along a network path and the various network monitors sense various different levels of congestion thereat, and communicates them to the sending node without there being any need for coordinating the operation of the network monitors in this regard. The sending node is responsive to the congestion levels thus communicated thereto for determining the size of the data segments transmitted thereby. Normally, the sending node will act upon the most severe congestion level that is communicated thereto.

Reference is now made to FIG. 5, which is a simplified block diagram illustration of apparatus for controlling the transmission rate of a network node in computer networks constructed and operative in accordance with a preferred embodiment of the present invention. First and second nodes 410 and 412 are connected to a computer network 414 along with one or more additional nodes 416. Normally, the network is connected to a large number of such nodes. Generally speaking, controlling the transmission rate of a network node reduces its capability to compete with other transmissions on the utilization of the bandwidth. Such means can be used by a network administrator to improve his control of the utilization of the bandwidth by various applications.

The network path between nodes 410 and 412 is illustrated for simplicity as including at least one intermediate node 418 and a network pathway 422. Other network pathways leading to various nodes 416 are also provided In the illustrated embodiment, intermediate node 418 controls the transmission rate of a network node 410 that is sending information to node 412 and is using pathway 422 in the direction indicated by arrow 424 for the transfer of the information.

At the beginning of a data communication session between nodes 410 and 412, each node, functioning as a sending node, typically transmits to the other a basic data segment of a size which does not exceed the size that the receiving node wishes to receive. However, before each node transmits the basic data segment it normally receives a notification from the corresponding receiving node of the maximum size of basic data segment that the receiving node wishes to receive.

Such notifications are normally exchanged during initial establishment of a connection between the nodes. Alternatively, such notification may be obviated in cases which the contents of a preceding notification may have been stored at the sending node upon earlier communication between the sending node and the receiving node. As a further alternative, notwithstanding such storage, the notifications are nevertheless provided. As an additional alternative, when such notifications are not sent for any reason, the sending node sends a basic data segment of a predetermined size.

The basic data segment may include one or more packets of a desired size. Preferably, but not necessarily, the basic data segment comprises a single packet. In such a case, determination of the size of the basic data segment is equivalent to determination of the size of the packet.

In accordance with a preferred embodiment of the present invention, intermediate node 418 is operative to transparently replace the notification sent by the receiving node with a substitute notification which, when controlling a node's transmission rate, indicates a basic segment size which is smaller than that in the original notification. This substitution causes the transmitting node to send a basic segment of a size smaller size than the size that would otherwise have sent and thus causes the basic segment size to be adaptively related to the extent of control applied to the transmission rate of the network node.

Figure 11A:
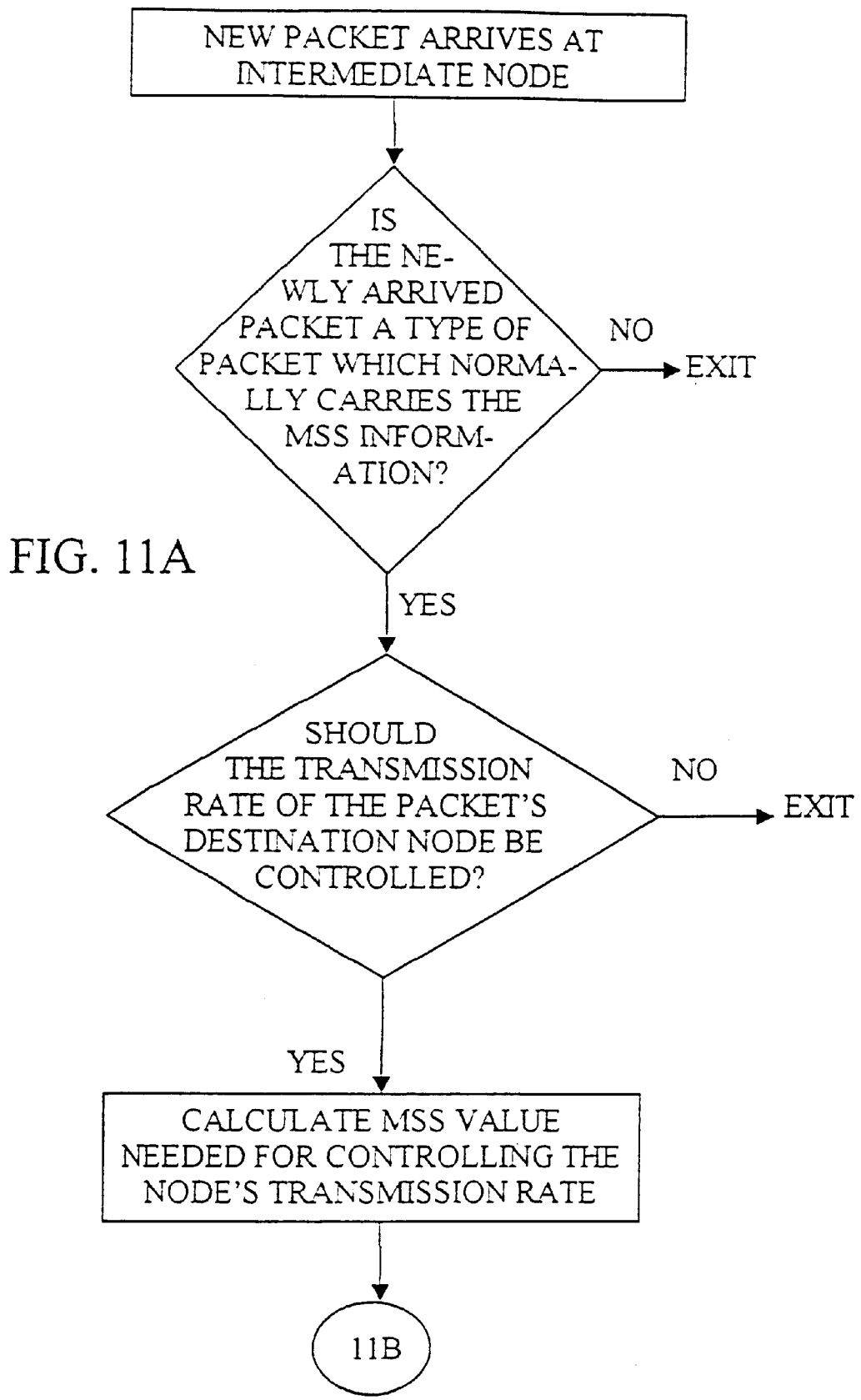
FIGS. 11A and 11B are together a simplified flow chart illustration of the operation of the embodiment of FIG. 5.
Figure 11B:
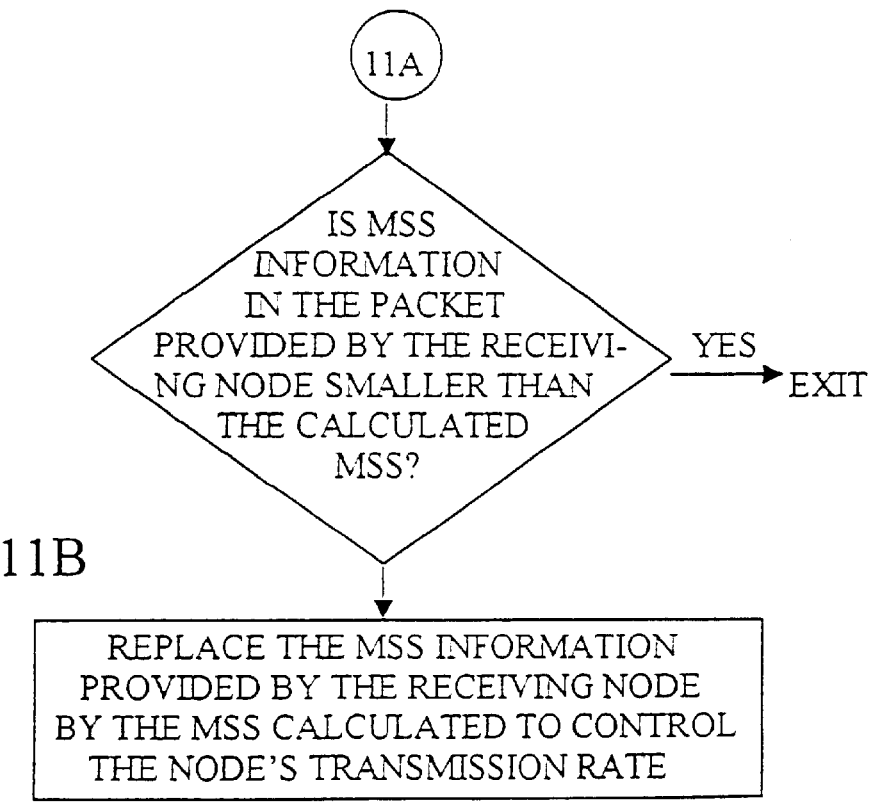

Reference is now made to FIGS. 11A and 11B, which together constitute a simplified flow chart illustration of the operation of the embodiment of FIG. 5 and specifically illustrate the operation of an intermediate node 418 in the context of the present invention. The operation of intermediate node 418 is typically initialized by arrival of a new packet. It is appreciated that the operation of intermediate node 418 in the context of the present invention may alternatively be initialized in another manner. It is further appreciated that intermediate node 418 may be any suitable type of device, including, for example, a router, switch, bandwidth management device or dedicated intermediate node whose sole operation is in the context of the present invention.

If the initializing event was the arrival of a packet of the type that normally does not carry information as to the maximum segment size (MSS), the intermediate node activity in the context of the present invention is completed.

If the initializing event was the arrival of a packet of the type that normally does carry information as to the maximum segment size, the intermediate node inquires whether there exists a current intention that the transmission rate of the packet's destination node should be controlled. If no, the intermediate node activity in the context of the present invention is completed. If yes, the intermediate node 418 compares the maximum segment size information in the received packet with the maximum segment size calculated by the intermediate node.

If the maximum segment size information in the received packet does not indicate a larger maximum segment size than that calculated, the intermediate node activity in the context of the present invention is completed If the maximum segment size information in the received packet does indicate a larger maximum segment size than that calculated, the intermediate node uses the above-calculated maximum segment size information to replace the maximum segment size information in the received packet and transmits the received packet, thus modified, to its destination.

It is appreciated that in the absence of maximum segment size information in received packets suitable for carrying maximum segment size information, it is assumed that information relating to the predetermined stored segment size is intended to be used by the sending node receiving such packets. In such a case, when transmission rate is to be controlled, the intermediate node adds maximum segment size information to packets which are sent to the sending node, which information indicates a maximum segment size which is smaller than the predetermined maximum segment size and causes the sending node to use this information.

It is a particular feature of the present invention that in an embodiment where there are a plurality of intermediate nodes located at various locations along a network path and the various intermediate nodes apply various different levels of control on the transmission rate, the most severe control is automatically applied to the sending node, without there being any need for coordinating the operation of the intermediate nodes in this regard.

It will be appreciated by persons skilled in the art that the present invention is not limited by what has been particularly shown and described hereinabove. Rather the scope of the invention includes both combinations and subcombinations of the various features described hereinabove as well as modifications and variations thereof which would occur to a person of ordinary skill in the art upon reading the foregoing description and which are not in the prior art.

What is claimed is:

1. A method for congestion control and avoidance in computer networks including the steps of:
    sensing network congestion; and
    allowing a network node to transmit a basic data segment having a size and thereafter to transmit additional data, the quantity of which is a function of the size of the basic data segment,
    wherein the size of the basic data segment is determined at least in part by sensed network congestion,
    and wherein said method is embodied in a TCP/IP protocol and is operative to vary the size of the basic data segment employed by said protocol,
    and wherein in said TCP/IP protocol, a TCP basic data segment is bound in size by a Maximum Segment Size (MSS) contained in a SYN packet that is provided by a receiving node to a sending node.

2. A method according to claim 1 and wherein the size of the basic data segment is determined by an intermediate node, which provides to a transmitting node false information regarding a maximum basic data segment size that a receiving node wishes to receive.

3. A method according to claim 1 and wherein the size of the basic data segment is determined by a sending node which senses congestion between itself and a receiving node and adjusts the basic data segment size in response to sensed congestion.

4. A method according to claim 1 and wherein the size of the basic data segment is limited by a receiving node which provides to the sending node information regarding maximum basic data segment size that it wishes to receive in response to sensed congestion.

5. A method according to claim 1 and wherein the size of the basic data segment is determined by a sending node which receives information from an external indicator, which sending node adjusts the basic data segment size in response to the information received.

6. A method according to claim 1 and wherein an intermediate node provides information regarding a maximum basic data segment size to a receiving node which conveys said information to the sending node.

7. A method for controlling the transmission rate of a network node in a computer network including the steps of:
    allowing a network node to transmit a basic data segment having a size and thereafter to transmit additional data, the quantity of which is a function of the size of the basic data segment; and
    determining the size of the basic data segment at least in part by employing an intermediate node, which provides to a transmitting node false information regarding a maximum basic data segment size that a receiving node wishes to receive.

8. A method according to claim 7 and wherein said method is embodied in a TCP/IP protocol and is operative to vary the size of the basic data segment employed by said protocol.

9. A method according to claim 8 and wherein in said TCP/IP protocol, a TCP basic data segment is bound in size by a Maximum Segment Size (MSS) contained in a SYN packet that is provided by a receiving node to a sending node.

10. Apparatus for congestion control and avoidance in computer networks comprising:
    a network congestion sensor; and
    a node transmission controller, allowing a network node to transmit a basic data segment having a size and thereafter to transmit additional data, the quantity of which is a function of the size of the basic data segment,
    wherein the size of the basic data segment is determined at least in part by sensed network congestion,
    and wherein a network congestion sensor and a node transmission controller are operative in accordance with a TCP/IP protocol and vary the size of the basic data segment employed in said protocol,
    and wherein in said TCP/IP protocol, a TCP basic data segment is bound in size by a Maximum Segment Size (MSS) contained in a SYN packet that is provided by the receiving node to the sending node.

11. Apparatus according to claim 10 and wherein the size of the basic data segment is determined by an intermediate node, which provides to a transmitting node false information regarding the maximum basic data segment size that a receiving node wishes to receive, in response to sensed congestion.

12. Apparatus according to claim 10 and wherein the size of the basic data segment is determined by a sending node which senses congestion between itself and a receiving node and adjusts the basic data segment size in response to sensed congestion.

13. Apparatus according to claim 10 and wherein the size of the basic data segment is limited by a receiving node which provides to a sending node information regarding maximum basic data segment size that it wishes to receive, in response to sensed congestion.

14. Apparatus according to claim 10 and wherein the size of the basic data segment is determined by a sending node which receives information from an external indicator and adjusts the basic data segment size in response to the information received.

15. Apparatus according to claim 10 and wherein an intermediate node provides information regarding the maximum basic segment size to a receiving node which conveys it to the sending node.

16. Apparatus for controlling the transmission rate of a network node in a computer network including:
   a node transmission controller, allowing a network node to transmit a basic data segment having a size and thereafter to transmit additional data, the quantity of which is a function of the size of the basic data segment,
   wherein the size of the basic data segment is determined at least in part by an intermediate node, which provides to a transmitting node false information regarding the maximum basic segment size that a receiving node wishes to receive.

17. Apparatus according to claim 16 and wherein a network congestion sensor and a node transmission controller are operative in accordance with a TCP/IP protocol and vary the size of the basic data segment employed in said protocol.

18. Apparatus according to claim 17 and wherein in said TCP/IP protocol, a TCP basic data segment is bound in size by a Maximum Segment Size (MSS) contained in a SYN packet that is provided by the receiving node to the sending node.

19. A method for congestion control and avoidance in computer networks including the steps of:
   sensing network congestion; and
   allowing a network node to transmit a basic data segment having a size and thereafter to transmit additional data, the quantity of which is a function of the size of the basic data segment,
   wherein the size of the basic data segment is determined at least in part by sensed network congestion,
   wherein the size of the basic data segment is determined by an intermediate node, which provides to a transmitting node false information regarding a maximum basic data segment size that a receiving node wishes to receive.

20. Apparatus for congestion control and avoidance in computer networks comprising:
   a network congestion sensor; and
   a node transmission controller, allowing a network node to transmit a basic data segment having a size and thereafter to transmit additional data, the quantity of which is a function of the size of the basic data segment,
   wherein the size of the basic data segment is determined at least in part by sensed network congestion,
   and wherein the size of the basic data segment is determined by an intermediate node, which provides to a transmitting node false information regarding the maximum basic data segment size that a receiving node wishes to receive, in response to sensed congestion.

* * * * *